(12) United States Patent
Takagi et al.

(10) Patent No.: US 8,106,940 B2
(45) Date of Patent: Jan. 31, 2012

(54) STEREOSCOPIC IMAGE DISPLAY APPARATUS AND STEREOSCOPIC IMAGE PRODUCING METHOD

(75) Inventors: Ayako Takagi, Yokosuka (JP); Yuzo Hirayama, Yokohama (JP); Sumihiko Yamamoto, Tokyo (JP); Masahiro Sekine, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1187 days.

(21) Appl. No.: 11/896,413

(22) Filed: Aug. 31, 2007

(65) Prior Publication Data

US 2008/0079805 A1  Apr. 3, 2008

(30) Foreign Application Priority Data

Sep. 29, 2006 (JP) ................................. 2006-268600

(51) Int. Cl.
*H04N 13/04* (2006.01)
(52) U.S. Cl. .......................................... 348/51; 348/58
(58) Field of Classification Search .................... 348/51, 348/58
See application file for complete search history.

(56) References Cited

U.S. PATENT DOCUMENTS

| | | | | |
|---|---|---|---|---|
| 6,603,504 B1 * | 8/2003 | Son et al. | ......................... | 348/54 |
| 7,046,271 B2 * | 5/2006 | Doerfel et al. | .................. | 348/51 |
| 7,446,733 B1 * | 11/2008 | Hirimai | ............................ | 345/32 |
| 2003/0067539 A1 * | 4/2003 | Doerfel et al. | .................. | 348/51 |
| 2005/0057807 A1 | 3/2005 | Takagi et al. | | |

FOREIGN PATENT DOCUMENTS

| | | |
|---|---|---|
| JP | 09-101481 | 4/1997 |
| JP | 2001-298754 | 10/2001 |
| JP | 2005-091623 | 4/2005 |

OTHER PUBLICATIONS

Saishu et al.; "53.3: Distortion Control in a One-Dimensional Integral Imaging Autosteroscopic Display System With Parallel Optical Beam Groups"; SID 04 Digest, pp. 1438-1441, (2004).
Hoshino et al.; "Analysis of Resolution Limitation of Integral Photography"; J. Opt. Soc. Am. A, vol. 15, No. 8, pp. 2059-2065, (Aug. 1998).

* cited by examiner

*Primary Examiner* — Moustafa M Meky
(74) *Attorney, Agent, or Firm* — Finnegan, Henderson, Farabow, Garrett & Dunner, L.L.P.

(57) ABSTRACT

A stereoscopic image display apparatus includes a two-dimensional display device having a display surface formed of a plurality of pixels arranged in a matrix form, and an optical plate which is provided in front of the display surface of the two-dimensional display device, which includes a plurality of lenses arranged so as to be respectively associated with elemental images each including a plurality of pixels, and which controls light rays illuminated from the pixels. When at least two and less than three elemental images are illuminated in one parallax direction in the case where a position of a part or whole of a stereoscopic image is located on a side nearer a viewer than a position indicating a near-side limit value Zno or on a side farther from the viewer than a position indicating a far-side limit value Zfo, the two-dimensional display device displays black in an elemental image of one parallax in elemental images of every two parallaxes.

10 Claims, 21 Drawing Sheets

| R1 | G2 | B3 | R4 | ... | B12 | R1 | G2 | ... | B12 | | |
|----|----|----|----|-----|-----|----|----|-----|-----|--|--|
| G1 | B2 | R3 | G4 | ... | R12 | G1 | B2 | ... | R12 | | |
| B1 | R1 | G3 | B4 | ... | G12 | B1 | R1 | ... | G12 | | |
| R1 | G2 | B3 | R4 | ... | B12 | R1 | G2 | ... | B12 | | |
| G1 | B2 | R3 | G4 | ... | R12 | G1 | B2 | ... | R12 | | |
| B1 | R1 | G3 | B4 | ... | G12 | B1 | R1 | ... | G12 | | |

STEREOSCOPIC IMAGE DISPLAY APPARATUS AND STEREOSCOPIC IMAGE PRODUCING METHOD

CROSS-REFERENCE TO RELATED APPLICATION

This application is based upon and claims the benefit of priority from prior Japanese Patent Application No. 2006-268600 filed on Sep. 29, 2006 in Japan, the entire contents of which are incorporated herein by reference.

BACKGROUND OF THE INVENTION

1. Field of the Invention

The present invention relates to a stereoscopic image display apparatus and a stereoscopic image producing method.

2. Related Art

A method of recording a stereoscopic image by using some method and reproducing it as a stereoscopic image is known. This method is called integral photography (hereafter referred to as IP method as well) or light ray reproduction method, and a large number of parallax images are displayed in this method. It is supposed that an object is viewed with left and right eyes. When a point A located at a short distance is viewed, an angle formed by the point A and the left and right eyes is denoted by $\alpha$. When a point B located at a long distance is viewed, an angle formed by the point B and the left and right eyes is denoted by $\beta$. The angles $\alpha$ and $\beta$ vary depending upon the position relation between the substance and the viewer. The difference $(\alpha-\beta)$ is called binocular parallax. Human being is sensitive to the binocular parallax and is able to conduct stereoscopic viewing.

In recent years, development of stereoscopic image display apparatuses without glasses has been promoted. Many of them use the ordinary two-dimensional display device (hereafter referred to as 2D display apparatus). Some optical plate is placed on the front or back of the two-dimensional display device, and the binocular parallax described above is utilized. Light rays can be made to appear to be illuminated from objects located several cm before and behind a display face of the two-dimensional display device when a viewer views the display face, by controlling angles of the light rays illuminated from the two-dimensional display device with the optical plate. This is because it has become possible to obtain an image which is high in definition to some degree even if light rays of the two-dimensional display device are distributed to several angles (called parallaxes), owing to implementation of the two-dimensional display device having a higher definition.

In the display apparatus of the integral imaging (abbreviated to II), light rays illuminated from one lens correspond to the number of element image groups, and the number is called number of parallaxes. In each lens, parallax rays are illuminated into equal distance angle distribution in a viewing angle independently of the viewer's position.

The resolution of a stereoscopic object displayed in the near-side direction and the far-side direction in a stereoscopic image display apparatus using the II method is explained in detail in H. Hoshino, F. Okano, H. Isono and I. Yuyama, "Analysis of resolution limitation of integral photography," J. Opt. Soc. Am, A15 (1998), pp. 2059-2065. An ideal stereoscopic image display apparatus in which one element image is seen from one lens or exit pupil is described therein. Therefore, the case where display degradation is caused by lens focus and consequently a plurality of element images are seen with respect to one lens or exit pupil is not described.

A method of reducing the left and right crosstalk by means of image processing is known (see, for example, JP-A 2001-298754 (KOKAI)). This method is a method of reducing the crosstalk by conducting image processing between two parallax images. In this method, averaging processing is conducted as concrete processing and prevention of a multiple image is not described.

A method of improving the resolution of a two-dimensional image utilizing crosstalk is known (see, for example, IP-A 2005-91623 (KOKAI)). In this method, the case where the resolution of the two-dimensional image is improved by crosstalk is described and a measure to counter the degradation of the stereoscopic image caused by the crosstalk is not described (see, for example, JP-A 2001-298754 (KOKAI)).

A structure in which an end part of a lens where the focus becomes dim is not used by placing a lens on the back and barrier printing is known (see, for example, JP-A 09-101481 (KOKAI)). Although this structure always reduces the crosstalk, the crosstalk is not eliminated completely, but moire is caused in some cases by printing black.

In SID004 Digest p. 1438 (2004), it is described that distortion is caused because orthographic projection is conducted in the II stereoscopic display method whereas when viewing an II three-dimensional image the viewer views it in the perspective projection.

When a lens array is used as the optical plate in the stereoscopic image display apparatus, a phenomenon called crosstalk occurs, i.e., information of an adjacent parallax image is mixed into the original parallax light ray, in some cases.

SUMMARY OF THE INVENTION

The present invention has been made in view of these circumstances, and an object of thereof is to provide a stereoscopic image display apparatus and a stereoscopic image producing method capable of preventing a multiple image and defocusing from being generated by crosstalk.

According to a first aspect of the present invention, there is a provided a stereoscopic image display apparatus including a two-dimensional display device having a display surface formed of a plurality of pixels arranged in a matrix form, and an optical plate which is provided in front of the display surface of the two-dimensional display device, which includes a plurality of lenses arranged so as to be respectively associated with elemental images each including a plurality of pixels, and which controls light rays illuminated from the pixels, wherein when at least two and less than three elemental images are illuminated in one parallax direction in case where a position of a part or whole of a stereoscopic image is located on a side nearer a viewer than a position indicating a near-side limit value Zno or on a side farther from the viewer than a position indicating a far-side limit value Zfo, the two-dimensional display device displays black in an elemental image of one parallax in elemental images of every two parallaxes.

According to a second aspect of the present invention, there is a provided a stereoscopic image display apparatus including a two-dimensional display device having a display surface formed of a plurality of pixels arranged in a matrix form, and an optical plate which is provided in front of the display surface of the two-dimensional display device, which includes a plurality of lenses arranged so as to be respectively associated with elemental images each including a plurality of pixels, and which controls light rays illuminated from the pixels, wherein when at least two and less than three elemental images are illuminated in one parallax direction in case where a position of a part or whole of a stereoscopic image is located on a side nearer a viewer than a position indicating a near-side limit value Zno or on a side farther from the viewer than a position indicating a far-side limit value Zfo, the two-dimensional display device displays a background image in an elemental image of one parallax in elemental images of every two parallaxes, and the background image has no correlation to the elemental image.

According to a third aspect of the present invention, there is provided a stereoscopic image display apparatus including a two-dimensional display device having a display surface formed of a plurality of pixels arranged in a matrix form, and an optical plate which is provided in front of the display surface of the two-dimensional display device, which includes a plurality of lenses arranged so as to be respectively associated with elemental images each including a plurality of pixels, and which controls light rays illuminated from the pixels, wherein when at least three elemental images are illuminated in one parallax direction in case where a position of a part or whole of a stereoscopic image is located on a side nearer a viewer than a position indicating a near-side limit value Zno or on a side farther from the viewer than a position indicating a far-side limit value Zfo, the two-dimensional display device displays black in elemental images of two parallaxes in elemental images of every three parallaxes.

According to a fourth aspect of the present invention, there is provided a stereoscopic image producing method for a stereoscopic image display apparatus, the stereoscopic image display apparatus including a two-dimensional display device having a display surface formed of a plurality of pixels arranged in a matrix form, and an optical plate which is provided in front of the display surface of the two-dimensional display device, which includes a plurality of lenses arranged so as to be respectively associated with elemental images each including a plurality of pixels, and which controls light rays illuminated from the pixels, the stereoscopic image producing method including acquiring near-side coordinate positions and far-side coordinate positions of a stereoscopic substance, and inserting black or an image pattern located behind the stereoscopic substance into an image of one parallax every two parallaxes in parallax images of the stereoscopic substance, at coordinates in a direction perpendicular to the display surface included in the near-side coordinate positions and far-side coordinate positions.

According to a fifth aspect of the present invention, there is provided a stereoscopic image producing method for fabricating a stereoscopic image by using a parallax image group formed of parallax images each having a depth map, the stereoscopic image producing method including inserting black or an image pattern located behind the stereoscopic substance into an image of one parallax every two parallaxes, with respect to an image located away from a display surface beyond a near-side limit position or a far-side limit position in the depth map.

BRIEF DESCRIPTION OF THE DRAWINGS

FIG. 5 is a diagram showing elemental images in the stereoscopic image display apparatus according to the first embodiment;

FIG. 6 is a diagram showing elemental images in a stereoscopic image display apparatus according to a modification of the first embodiment;

DETAILED DESCRIPTION OF THE INVENTION

Hereafter, embodiments of the present invention will be described in detail with reference to the drawings.

First Embodiment

Figure 1:
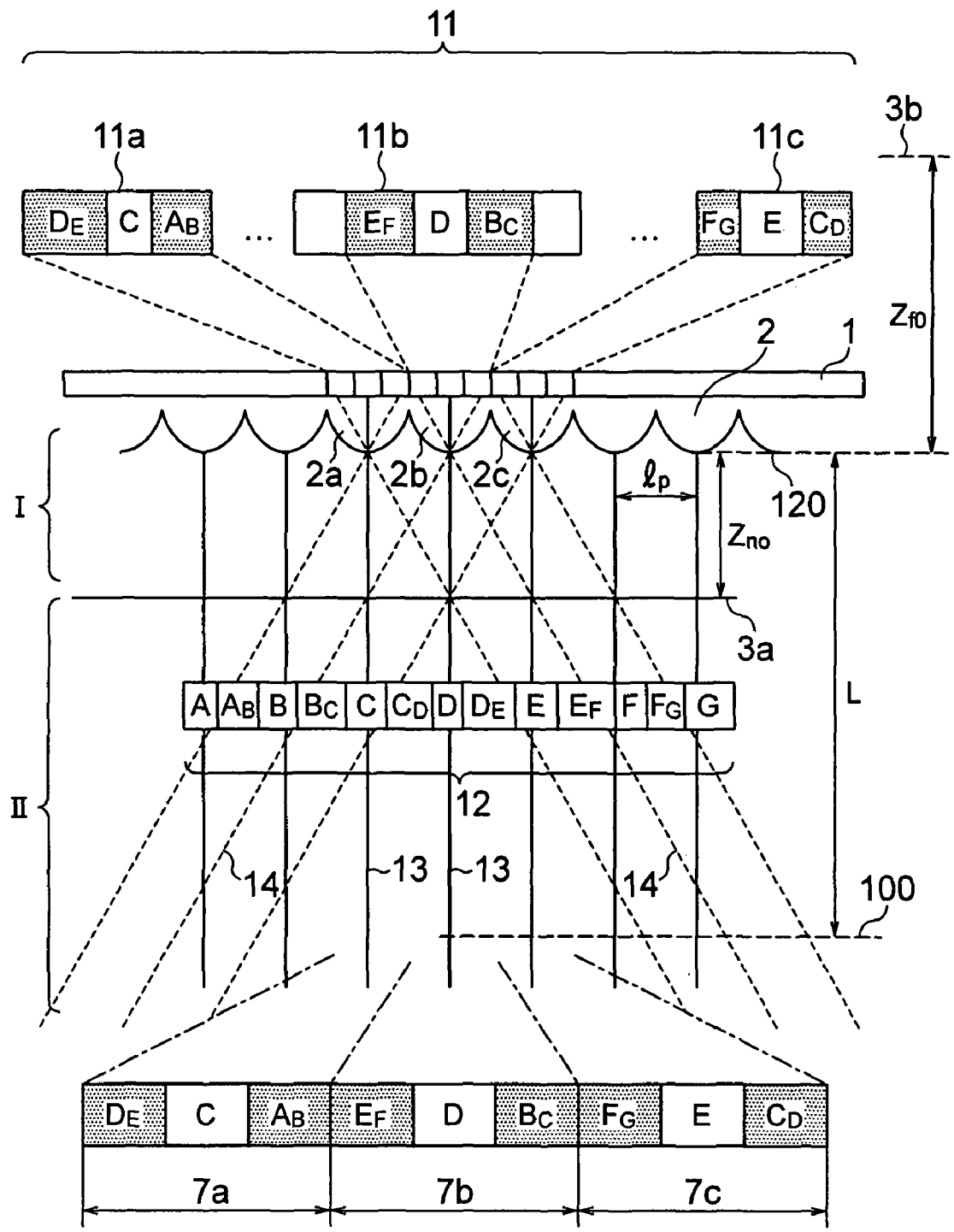
FIG. 1 is a diagram for explaining a stereoscopic image display apparatus according to a first embodiment.

A stereoscopic image display apparatus according to a first embodiment of the present invention will now be described with reference to FIG. 1. FIG. 1 is a diagram for explaining an image pattern of a stereoscopic image which enters eyes of a viewer in the stereoscopic image display apparatus according to the present embodiment. FIG. 1 is a top view of the stereoscopic image display apparatus according to the present embodiment.

The stereoscopic image display apparatus according to the present embodiment includes a two-dimensional display device 1 having pixels arranged in a matrix form, and a lenticular lens 2 formed of a plurality of lenses provided in front of a display face of the two-dimensional display device 1 to serve as an optical plate which controls light rays illuminated from the two-dimensional display device 1.

In FIG. 1, the viewer is located on a viewing distance plane 100 which is at a viewing distance L from surface 120 of the lenticular lens 2, and the viewer faces a center part of a display surface. A light ray locus of a parallax image viewed by the viewer is called main parallax light ray 13, and represented by a solid line in FIG. 1. A light ray locus of an image having parallax information adjacent to the main parallax light ray 13 is called adjacent parallax light ray 14, and represented by a dotted line. If there is not crosstalk, the viewer cannot view the adjacent parallax light ray 14.

Figure 27:
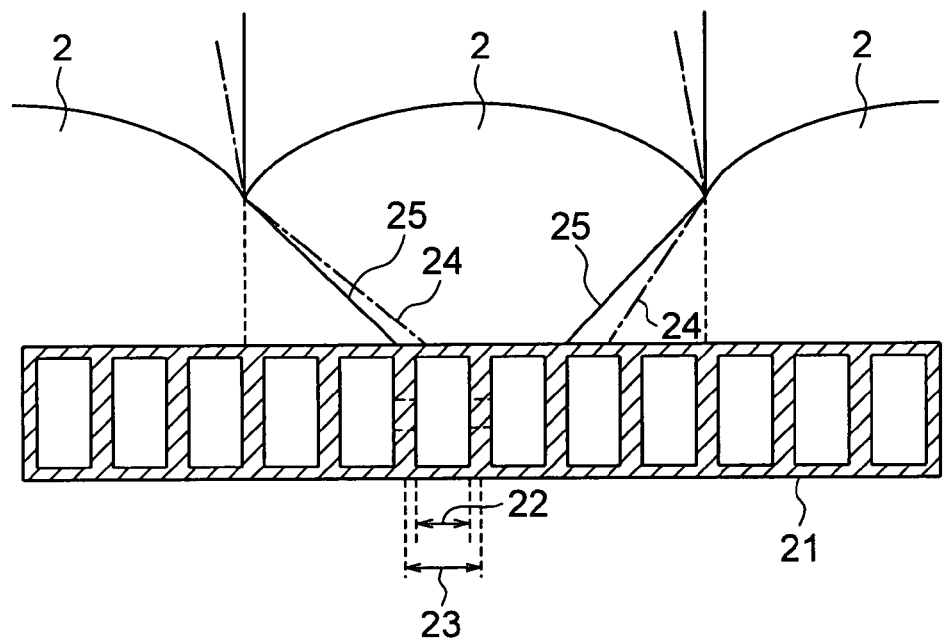
FIG. 27 is a diagram showing an example of crosstalk caused by defocusing of a lens when a gap between a lens and a display face of a two-dimensional display device is short.
Figure 28:
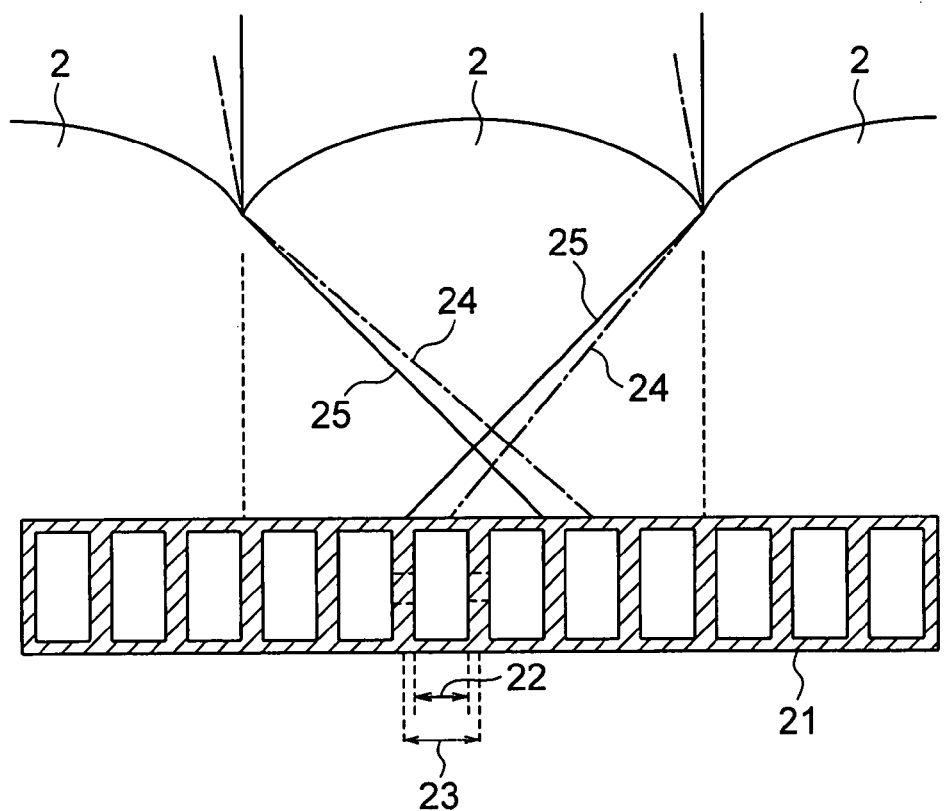
FIG. 28 is a diagram showing an example of crosstalk caused by defocusing of a lens when a gap between a lens and a display face of a two-dimensional display device is long.

The cause of crosstalk occurrence will now be described with reference to FIGS. 27 and 28. FIG. 27 shows an example in which a focal distance of a lens 2 is shorter than a distance between the lens 2 and a two-dimensional display device 1 and crosstalk corresponding to two parallaxes occurs. FIG. 28 shows an example in which the focal distance of the lens 2 is longer than the distance between the lens 2 and the two-dimensional display device 1 contrary to the case of FIG. 27 and crosstalk corresponding to two parallaxes occurs. In this way, the crosstalk is caused by defocus of the lens in some cases. In FIGS. 27 and 28, reference numeral 21 denotes a black matrix, reference numeral 22 denotes an aperture of a width of a sub-pixel (for example, a red, blue or green sub-pixel), and reference numeral 23 denotes the width of a sub-pixel. Reference numeral 24 denotes a light ray locus having crosstalk of two parallaxes and having a converging center of the lens on a center of a sub-pixel. Reference numeral 25 denotes a light ray locus having crosstalk of two parallaxes and having a converging center of the lens between sub-pixels.

In some cases, a three-dimensional display apparatus is generated by placing a lens aslant to an ordinary two-dimensional display device having pixels in the horizontal and vertical directions in order to reduce the moire, in some cases. In some cases, crosstalk of at least two parallaxes necessarily occurs.

In addition, crosstalk is caused depending upon the illuminated direction by spherical aberration of the lens itself.

Figure 29:
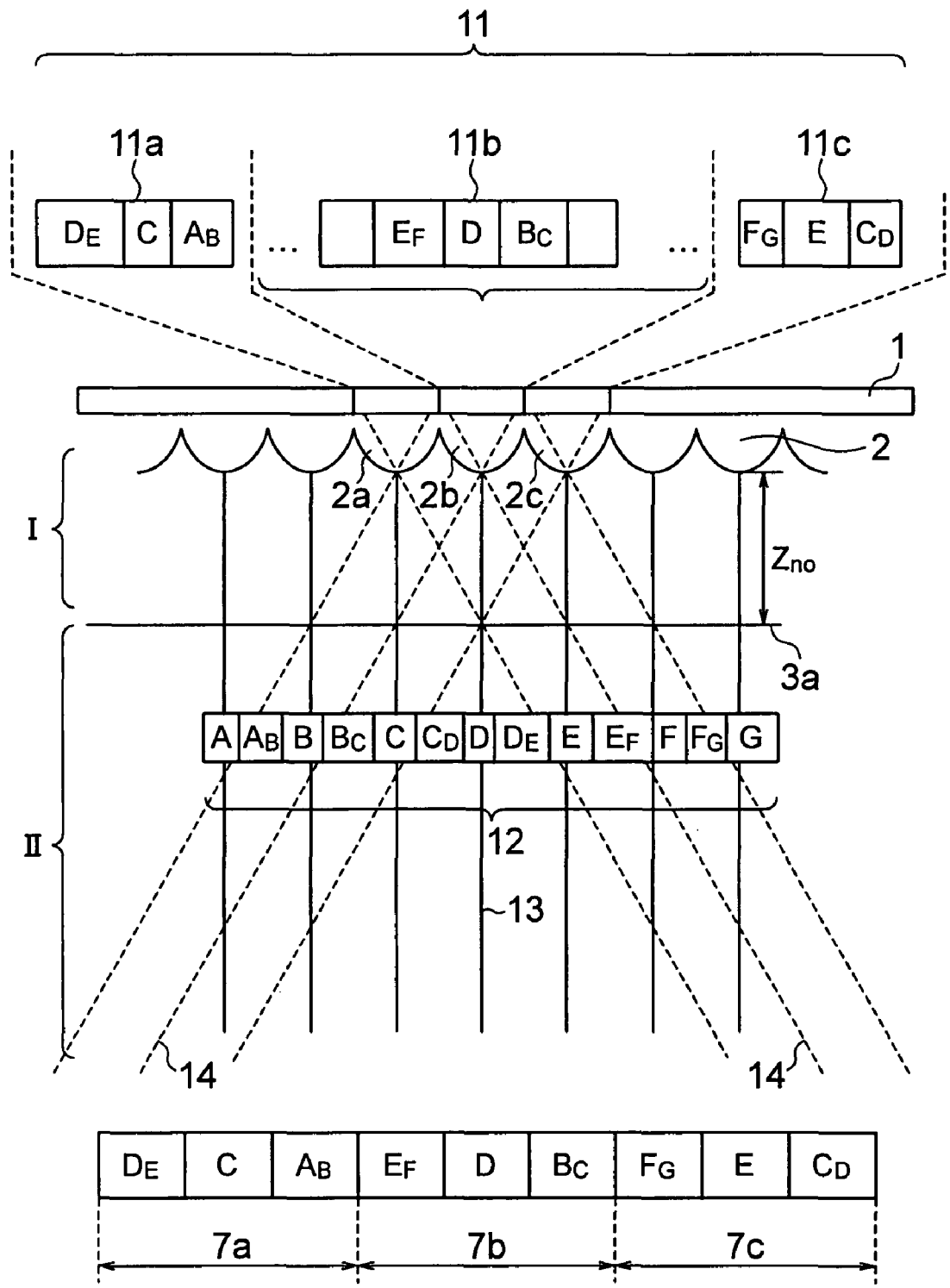
FIG. 29 is a diagram for explaining a conventional stereoscopic image display apparatus.

With reference to FIG. 29, a stereoscopic image which enters eyes of the viewer when crosstalk of at least two parallaxes has occurred will now be described. In FIG. 29, reference numeral 1 denotes a two-dimensional display device and reference numeral 2 denotes a lenticular lens. Reference numeral 3a denotes a near-side limit position, and reference numerals 7a, 7b and 7c denote elemental images respectively corresponding to lenses 2a, 2b and 2c. Reference numeral 12 denotes an image pattern of a stereoscopic substance, and reference numeral 11 denotes an image pattern of a stereoscopic substance projected and assigned on the two-dimensional display device 1. Reference numeral 11a denotes an image pattern of an elemental image group corresponding to the lens 2a, 1b an image pattern of an elemental image group corresponding to the lens 2b, and 11c an image pattern of an elemental image group corresponding to the lens 2c. Reference numeral 13 denotes a main parallax light ray, and reference numeral 14 denotes an adjacent parallax light ray.

It is supposed that the main parallax light ray 13 is located in front of the viewer. The position where an adjacent parallax light ray 14 of a main parallax light ray 13 intersects a main parallax line 13 of a lens corresponding to the main parallax light ray 13, for example, the adjacent lens 2a for the lens 2b is a position 3a where the Nyquist frequency depending upon the lens pitch coincides with a frequency depending upon the light ray strength, and the position is called near-end limit. The distance between the surface of the lens 2 and the near-end limit is called near-end limit value Zno. The same position exists in the far-side direction as well, and it is called far-end limit (See H. Hoshino, F. Okano, H. Isono and I. Yuyama, "Analysis of resolution limitation of integral photography," J. Opt. Soc. Am, A15 (1998) pp. 2059-2065).

Figure 30:
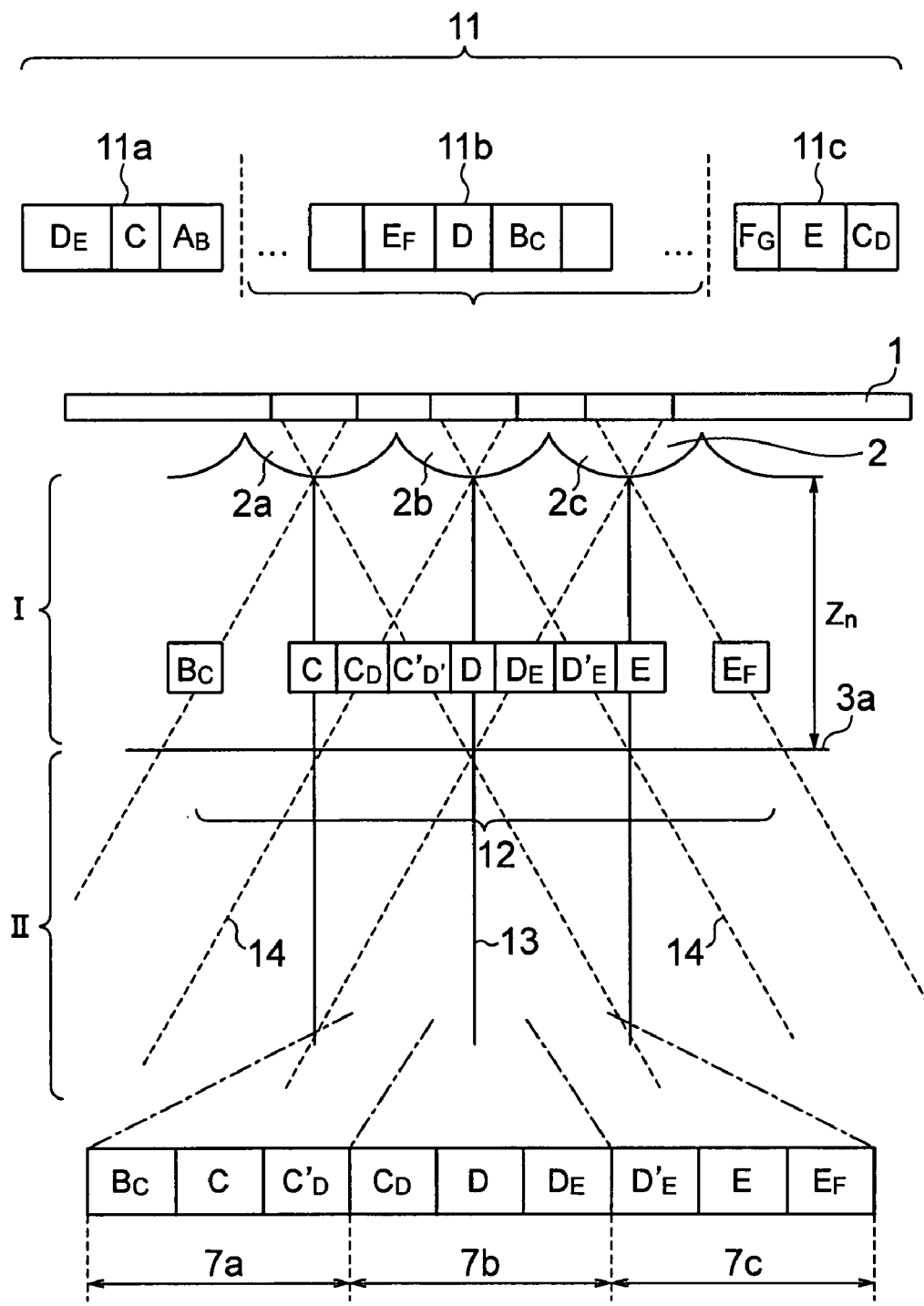
FIG. 30 is a diagram for explaining a conventional stereoscopic image display apparatus.

According to JP-A 2005-91623 (KOKAI), a multiple image is not apt to occur if the distance between the stereoscopic image and the lens surface is within the near-side limit value. The reason will now be described. An image of the adjacent parallax light ray 14 caused by crosstalk is located in such a position as to interpolate the inside of image positions of adjacent lenses in many cases as shown in FIG. 30. Even if crosstalk occurs, therefore, it is inconspicuous and a phenomenon such as coordinate folding back does not occur. As a result, a multiple image is not apt to occur.

It is supposed that crosstalk has occurred in a near-side position located on the viewer side as compared with the near-side limit value Zno or in a position in the far-side direction as compared with the far-side limit value. An example of a stereoscopic image placed in a part of a near-side region 11 is shown in FIG. 29. However, images $A_B$ and $E_F$ are mixed between images C and D, and an image of a stereoscopic substance which is not present between the images C and D is seen. Therefore, an image located near an image A is seen twice on the left and right sides with adjacent parallax light rays besides the main parallax light ray. If a multiple image is generated or the repetition pitch of the multiple images is narrow, therefore, the image becomes unclear. Thus, existence of a problem that the image looks defocused has been found.

If the distance g between the lens array 2 and the two-dimensional display device 1 shown in FIG. 29 and a focal length f of the lens 2 satisfy the relation g=f, only information of one parallax image is illuminated. Depending upon the position where the viewer views the lens, the precision in manufacture of the stereoscopic image display apparatus, and so on, only one piece of parallax information from one lens does not always enter the eyes of the viewer (see FIGS. 27 and 28).

As for the left-right position relation of a plurality of elemental images of the two-dimensional display device 1 located behind the lens and the left-right position relation of elemental images actually seen on viewer's eyes when crosstalk occurs and consequently a plurality of parallax images are seen from one lens, the left-right position relation between elemental images on the two-dimensional display device 1 and elemental images seen on the eyes becomes reverse if f<g (the case shown in FIG. 27). If f>g (the case shown in FIG. 28), the left-right position relation between elemental images on the two-dimensional display device 1 and elemental images seen on the eyes becomes the same (see JP-A-2005-91623). Therefore, how elemental images are seen shown in FIG. 29 shows the case where f>g (the case shown in FIG. 28).

Figure 31:
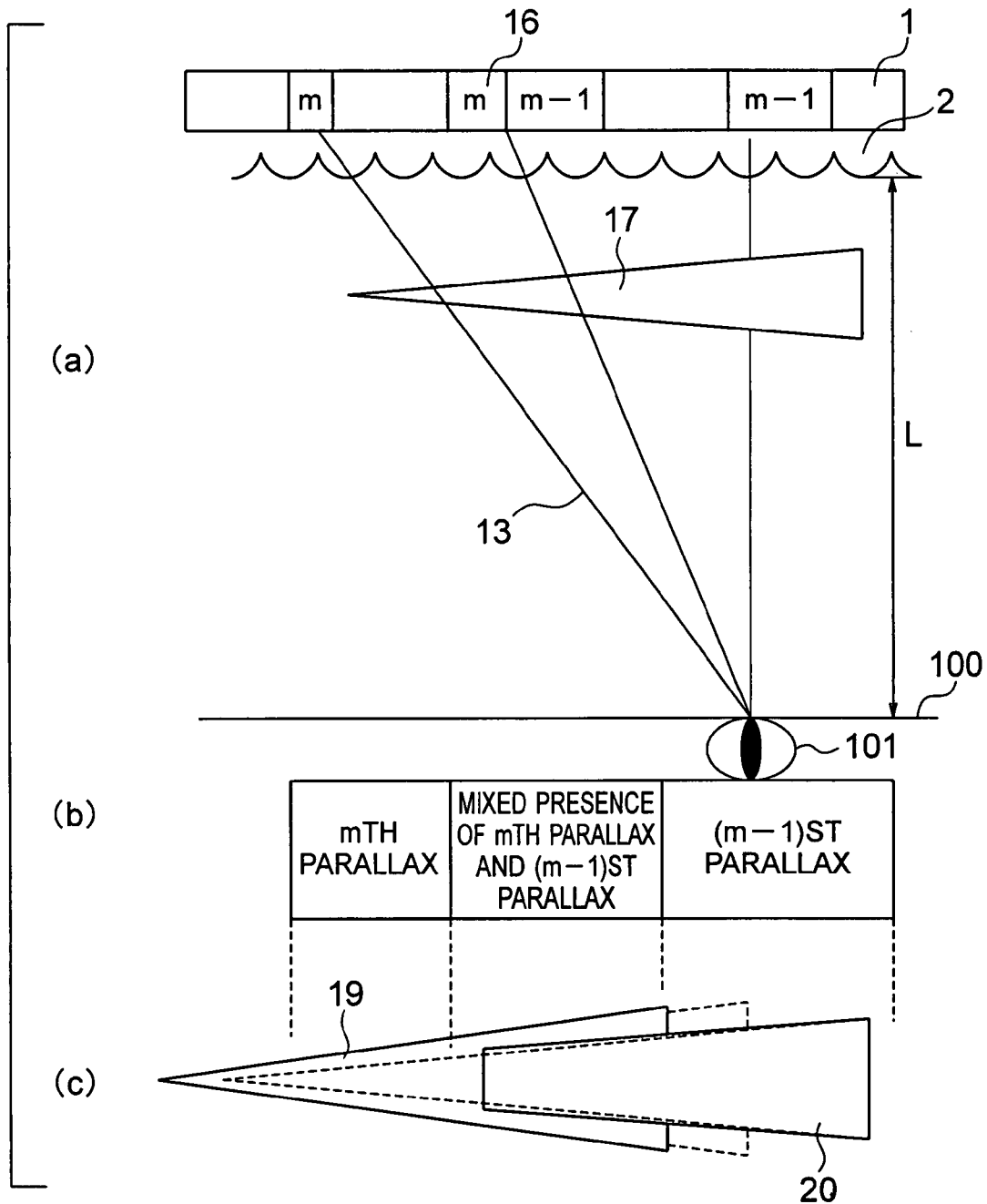
FIGS. 31(a) to 31(c) are diagrams for explaining how a stereoscopic substance looks when parallax shifts in a conventional stereoscopic image display apparatus.

A problem that elemental images of two parallaxes are seen from one lenticular lens resulting in display degradation although not much crosstalk is not the cause will now be described with reference to FIG. 31($a$) to 31($c$).

In the II method, elemental images are not illuminated so as to meet the viewer's eyes. As shown in FIGS. 31($a$), 31($b$) and 31($c$), therefore, the direction of the light ray varies depending upon from which part of the two-dimensional display device 1 located behind the lens 2 the light ray is illuminated according to the horizontal position of the stereoscopic image display apparatus. An image 19 is shown in FIG. 31($c$) to indicate how a stereoscopic substance 17 viewed by a viewer 101 in FIG. 31($a$) is seen. FIG. 31($b$) shows which elementary image the viewer 100 is viewing according to the position of the horizontal plane. For example, if the light ray direction is located at the center of a sub-pixel, there is a position where an image of mth parallax or an image of (m−1)st parallax is seen. If the light ray direction is located on a black matrix between sub-pixels, both the image of mth parallax and the image of the (m−1)st parallax are seen (see FIG. 31($b$)). According to SID004 Digest p. 1438 (2004), orthographic projection is conducted in the horizontal direction in the II stereoscopic image producing method. As the z position in the near-side direction becomes large, therefore, a stereoscopic image slightly spread in the horizontal direction is viewed. In a horizontal position where the mth parallax and the (m−1)st parallax are seen simultaneously in one lens, therefore, a stereoscopic substance with parts of stereoscopic images overlapped is viewed as shown in FIG. 31($c$). In FIGS. 31($a$), 31($b$) and 31($c$), reference numeral 1 denotes a two-dimensional display device, reference numeral 2 is a lenticular lens, reference numeral 13 is a main parallax light ray, reference numeral 16 is a parallax number assigned on the two-dimensional display device 1, reference numeral 17 is a stereoscopic substance, reference numeral 19 is an image pattern of the mth parallax number viewed by a viewer concerning the stereoscopic substance 17, and reference numeral 20 is an image pattern of the (m−1)st parallax number viewed by the viewer concerning the stereoscopic substance 17.

The above-described obstruction is shown in FIG. 29 in the relation between the main parallax light rays and adjacent parallax light rays. The viewer views a stereoscopic image with a part of the stereoscopic substance overlapped on the viewer side as compared with the near-side limit position 3$a$ having no image of adjacent parallax light ray between main parallax light rays of adjacent lenses, in a partial region. Thus, the viewer has a sense of incompatibility as a stereoscopic substance, resulting in a display obstruction.

If a position z of a part or the whole of a stereoscopic image displayed by a stereoscopic image display apparatus according to the present embodiment is located near the viewer than a position 3$a$ which indicates the near-side limit value Zno (z>Zno), i.e., if the part or the whole of the stereoscopic image is located in a region II shown in FIG. 1, or if a part or the whole of a stereoscopic image is located farther from the viewer than a position 3$b$ which indicates a far-side limit value Zfo (z<Zfo), black is displayed in an elemental image of one parallax in elemental images of every two parallaxes when crosstalk is at least two parallaxes and less than three parallaxes (when an elemental image of at least 2 and less than 3 is illuminated in one parallax direction). By the way, the position z is set equal to 0 on the lens surface 120 of the lenticular lens 2. The position z becomes positive in a direction directed from the lens toward viewer, whereas the position z becomes negative in a direction directed toward the opposite side of the viewer. Therefore, the far-side limit value Zfo assumes a negative value. If the position z is within the near-side limit value Zno (a region I shown in FIG. 1) or the far-side limit value Zfo, a multiple image is not apt to occur. The following reason is considered. In many cases, an image of an adjacent parallax light ray generated by crosstalk is located in such a position as to interpolate the inside of image positions of adjacent lenses. Even if crosstalk occurs, therefore, it is inconspicuous and a coordinate folding back phenomenon does not occur. As a result, the multiple image is not apt to occur.

It is supposed in the stereoscopic image display apparatus that an image pattern 12 in one horizontal direction of a stereoscopic substance includes images A, $A_B$, $B_C$, C, $C_D$, D, $D_E$, E, $E_F$, F, $F_G$ and G. In this case, an image pattern 11 of the stereoscopic substance on the two-dimensional display device 1 includes elemental images $D_E$, C and $A_B$ as a pattern 11$a$ in an elemental image group for a lens 2$a$ of the lenticular lens 2, includes elemental images $E_F$, D and Bc as a pattern 11$b$ in an elemental image group for a lens 2$b$ of the lenticular lens 2, and includes elemental images $F_G$, E and $C_D$ as a pattern 11$_c$ in an elemental image group for a lens 2$c$ of the lenticular lens 2. With respect to such elemental images on the two-dimensional display device 1, elemental images of one parallax among elemental images of every two parallaxes, i.e., the elemental images $D_E$, $A_B$, $E_F$, $B_C$, $F_G$ and $C_D$ in FIG. 1 are displayed black (represented by being shaded in FIG. 1). Thereupon, an elemental image 7$a$ of the lens 2$a$ includes the elemental image $D_E$ modified so as to be displayed black, the elemental image C which is not modified, and the elemental image $A_B$ modified so as to be displayed black. An elemental image 7$b$ of the lens 2$b$ includes the elemental image $E_F$ modified so as to be displayed black, the elemental image D which is not modified, and the elemental image $B_C$ modified so as to be displayed black. An elemental image 7$c$ of the lens 2$c$ includes the elemental image $F_G$ modified so as to be displayed black, the elemental image E which is not modified, and the elemental image $C_D$ modified so as to be displayed black. The elemental images A, B, C, D, E, F and G are main parallax images corresponding to the main parallax light rays 13. The elemental images $A_B$, $B_C$, $C_D$, $E_F$ and $F_G$ have become adjacent parallax images corresponding to the adjacent parallax light rays 14.

Thus, in the image pattern of the stereoscopic substance viewed by the viewer in the present embodiment, an image corresponding to one parallax every two parallaxes is displayed black, and especially adjacent parallax images are displayed black. Unlike the conventional case shown in FIG.

29, therefore, images obtained from adjacent parallax light rays 14 seen on both sides of the main parallax line 13 are displayed black. For example, the adjacent parallax images $A_B$ and $E_F$ are displayed black between the main parallax images C and D. It becomes possible for the viewer to view only the original parallax light rays, and a multiple image and defocusing can be prevented.

According to H. Hoshino, F. Okano, H. Isono and I. Yuyama, "Analysis of resolution limitation of integral photography," J. Opt. Soc. Am, A15 (1998), pp. 2059-2065, the near-side limit value Zno and the far-side limit value Zfo are represented by the following equations.

$$Zno = L \times D/(1+D)$$

$$Zfo = -L \times D/(1-D)$$

Denoting a viewing distance by L, a lens pitch by lp, a viewing angle by $2\theta$, a pixel pitch of the two-dimensional display device 1 by $p_p$, D is represented by the following equation.

$$D = \frac{(lp)^2}{2L\tan(\theta)}$$

More specifically, the degree of crosstalk reduction obtained by displaying an adjacent parallax-light ray black will now be described.

A longitudinal lenticular lens formed by arranging a plurality of lenses having parallel optical axes is used for a pixel row in the vertical direction of the two-dimensional display device as an optical plate. A relative value of light ray strength of a parallax light ray corresponding to one sub-pixel for the horizontal position of the viewer will now be described for the case where the crosstalk has two parallaxes.

Figure 2:
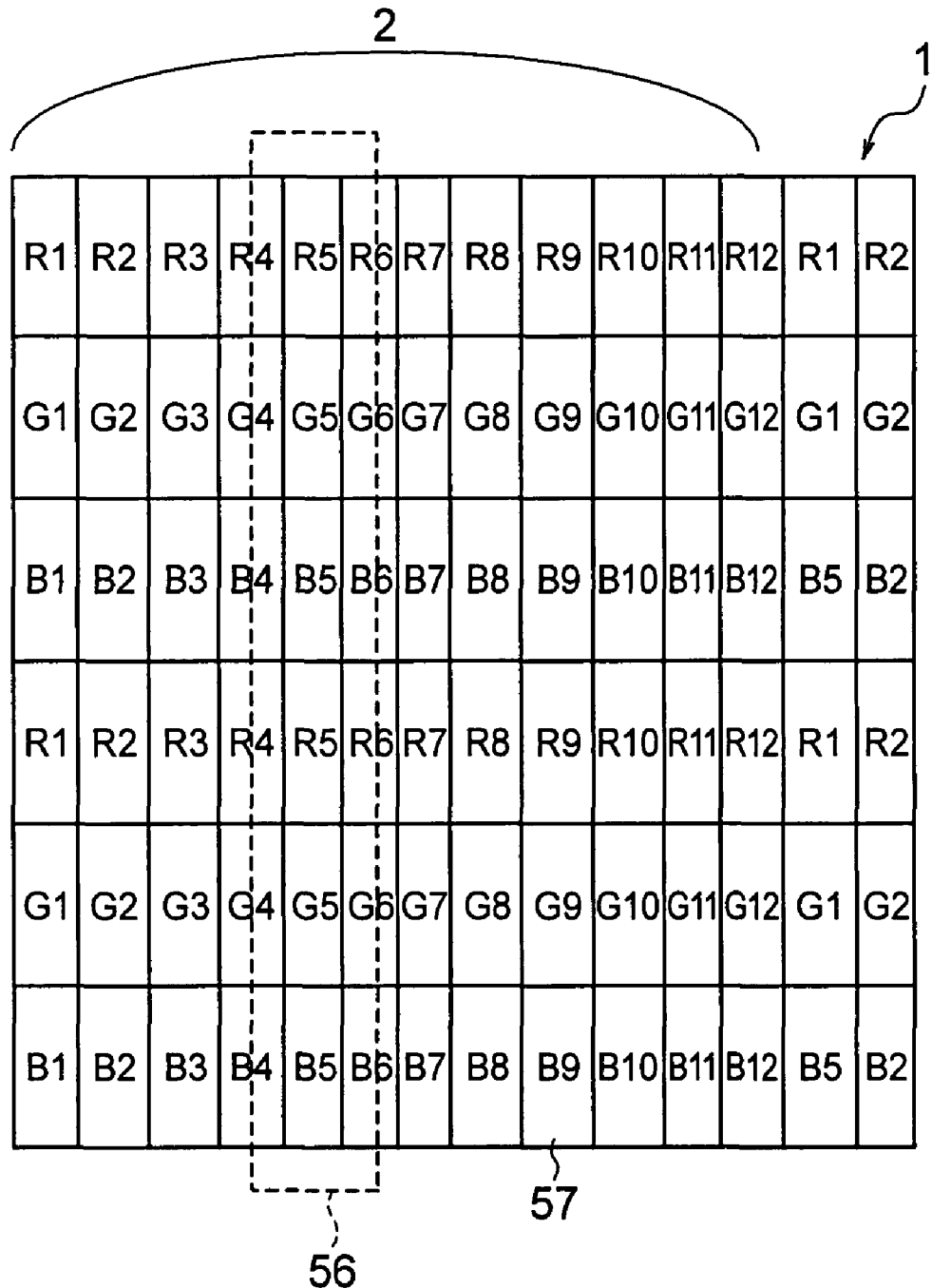
FIG. 2 is a diagram showing an example of mapping of elemental images in a stereoscopic image display apparatus obtained by combining a two-dimensional display device with lens arrays in the longitudinal direction.

It is now supposed that the longitudinal lenticular lens is placed on a two-dimensional display device having pixels arranged in a matrix form and a stereoscopic image display apparatus is implemented. FIG. 2 shows an example of elemental images of the stereoscopic image display apparatus.

In FIG. 2, elemental images per lens are denoted by R1, G1 and B1, and they represent one-parallax image of red, one-parallax image of green and one-parallax image of blue, respectively. Reference numeral 56 shown in FIG. 2 is an area of converging conducted by the lens array on a light ray arriving at eyes of the viewer. As the converging area 56 has a larger width in the horizontal direction, information of a plurality of elemental images 57 is mixed in the parallax light ray arriving at the eyes of the viewer, resulting in more crosstalk. According to an experimental value, the stereoscopic image tends to be degraded if the crosstalk exceeds two parallaxes. FIG. 2 shows the converging area 56 in the case where the crosstalk has two parallaxes.

Here, "the crosstalk has two parallaxes" means that the focal distance of the lens 2 does not coincide with the gap between the lens and the two-dimensional display device due to defocusing of the lens as shown in FIGS. 27 and 28 used to describe the conventional art and an elemental image illuminated from the lens corresponds to two parallaxes of the two-dimensional image display device. FIG. 1 shows the case where a crosstalk image in the same direction as the elemental image is seen especially in the lateral direction. As shown in FIG. 27, therefore, it corresponds to the case where the focal distance is shorter than the gap between the lens and the two-dimensional display device.

Figure 3:
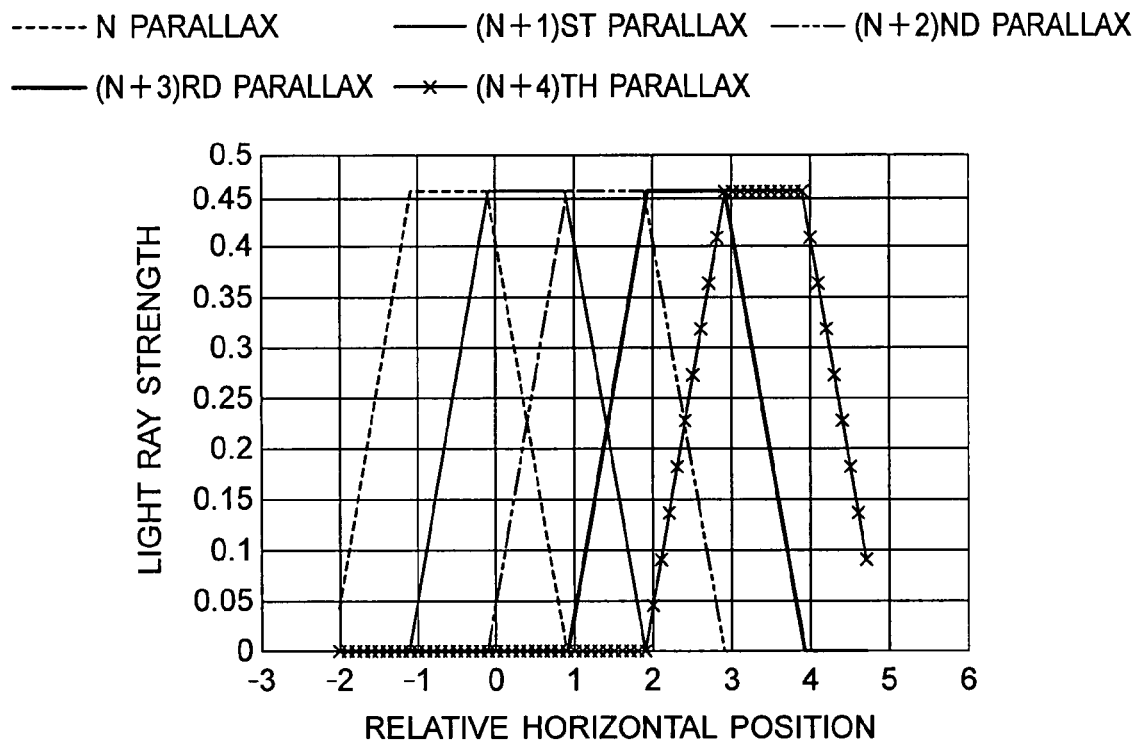
FIG. 3 is a diagram showing a relation between light ray luminance and a horizontal relative position of a stereoscopic image display apparatus which does not insert black in a parallax image.

Light ray strength found as a function of the relative horizontal position by calculation when the crosstalk has two parallaxes in the conventional stereoscopic image display apparatus is shown in FIG. 3. The following calculation conditions have been used. A black matrix for hiding wiring is provided between sub-pixels in the two-dimensional display device. The ratio of the black matrix is supposed to be 10%, and the aperture rate is supposed to be 90%. As for the luminance of all parallax light rays, the luminance is supposed to be 100%. For the crosstalk having two parallaxes, the luminance of one parallax light ray becomes 45% at maximum by taking the black matrix as well into consideration.

In the conventional art, three parallaxes at maximum are viewed in some part between 0 and 1 in the relative horizontal position as shown in FIG. 3.

Figure 4:
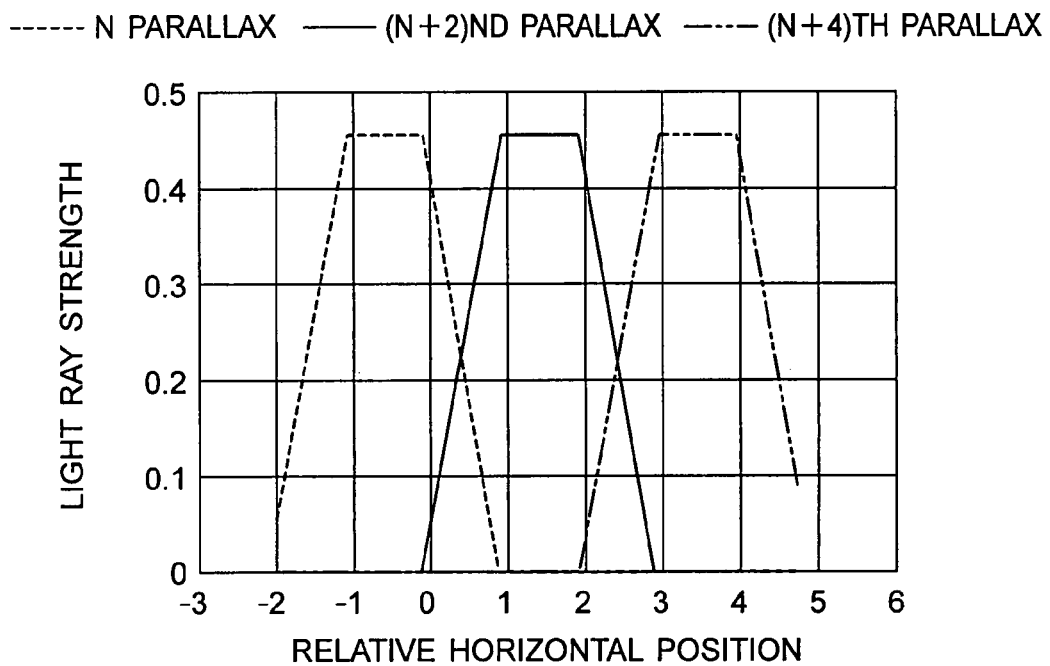
FIG. 4 is a diagram showing a relation between light ray luminance and a horizontal relative position of a stereoscopic image display apparatus according to a first embodiment.

On the other hand, FIG. 4 shows a calculation result of luminance distribution in the case where one parallax in two parallaxes is displayed black as in the stereoscopic image according to the present embodiment. Comparing FIG. 4 with FIG. 3, it is appreciated that in the conventional art at least two parallaxes are seen in all relative horizontal positions whereas a region in which images corresponding to two parallaxes are seen is reduced to half of the whole if one parallax in two parallaxes is displayed black as in the present embodiment.

Although not illustrated in the graph, it can be inferred from the result shown in FIG. 4 that a region in which images corresponding to two parallaxes are seen disappears if the original crosstalk quantity is 1.5 parallaxes or less.

Which effect is brought about by making one of two elemental images in one lens black will now be described concretely. Typically, elemental images become single elements of respective parallax images in a certain lens position. For example, elemental images of a certain lens display images of 1 parallax, 2 parallaxes, 3 parallaxes, ..., 2n (=N) parallaxes in that lens position. Elemental images of an adjacent lens display images of 1 parallax, 2 parallaxes, 3 parallaxes, ..., 2n (=N) parallaxes in that lens position in a position shifted by one coordinate as the parallax image. In other words, inserting black into alternate one of two elemental images is equivalent to always making the whole images of the 2 parallaxes, 4 parallaxes, ..., 2n (=N) parallaxes.

For example, in the case of 12 parallaxes, 1 parallax, 2 parallaxes, 3 parallaxes, 4 parallaxes, ..., 12 parallaxes are present as ordinary parallax images. Among the parallax images, the whole images of the 2 parallaxes, 4 parallaxes, ..., 6 parallaxes are made black. In other words, a stereoscopic image with a multiple-image and defocusing prevented from being caused by crosstalk can be obtained by making black in the stage of parallax images.

As another producing method, one of two elemental images may be made black in the stage where interleaving of parallax images for conducting stereoscopic display has been finished. In this case as well, the effect similar to those of the present embodiment can be obtained.

An example of parallax image mapping in the stereoscopic image display apparatus according to the present embodiment is shown in FIG. 5. For example, if the number of parallaxes is 12 parallaxes, 1 parallax, 2 parallaxes, 3 parallaxes, 4 parallaxes, ..., 12 parallaxes stand in a row in the horizontal direction as ordinary elemental images. For example, making even-numbered parallaxes black as shown in FIG. 5 produces 1 parallax, black, 3 parallaxes, black, 5 parallaxes, .... The crosstalk can be reduced by these operations.

An example of parallax image mapping in a stereoscopic image display apparatus according to a modification of the present embodiment is shown in FIG. 6. The stereoscopic image display apparatus according to the present modification uses a structure having a lens array inclined in optical axis to a pixel row in the vertical direction of the two-dimensional display device as the optical plate. If the number of parallaxes is set equal to 16 parallaxes and, for example, even-numbered parallaxes are made black in the modification, the mapping can be implemented by making pixels having a certain regularity black as shown in FIG. 6.

According to the present embodiment, it is possible to prevent a multiple image and defocusing from being caused by crosstalk as heretofore described.

Second Embodiment

Figure 7:
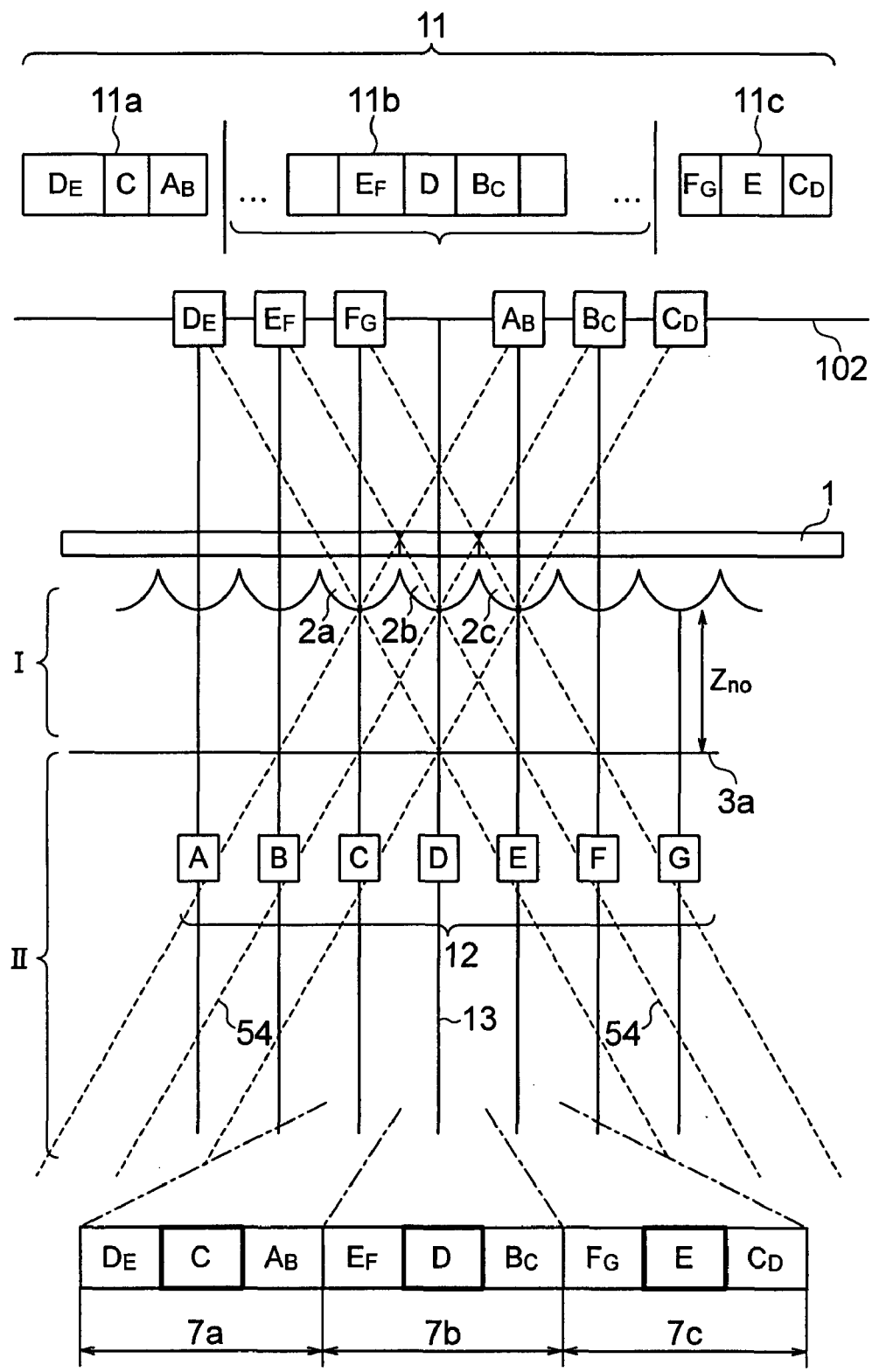
FIG. 7 is a diagram for explaining a stereoscopic image display apparatus according to a second embodiment.

A stereoscopic image display apparatus according to a second embodiment of the present invention will now be described with reference to FIG. 7.

If black is inserted into one parallax out of two parallaxes, i.e., one parallax is displayed black as in the first embodiment, the number of viewed parallaxes differs depending upon the screen position. If the black-inserted parts become dark and other parts remain bright, therefore, moire becomes apt to occur.

In the stereoscopic image display apparatus according to the present embodiment, therefore, a background image having no correlation to the image pattern 12 of the stereoscopic substance is inserted at a rate of one parallax every two parallaxes, unlike the first embodiment. As a result, it becomes possible to obtain a stereoscopic image with the sense of incompatibility reduced and the multiple image or defocusing prevented. For example, in FIG. 7, parallax images $A_B$, $B_C$, $C_D$, $D_E$, $E_F$ and $F_G$ corresponding to adjacent parallax light rays 54 in an image pattern 12 of the stereoscopic substance are replaced with background images (102 in FIG. 7) having no correlation to the image pattern 12 of the stereoscopic substance.

Specifically, in the case of 12 parallaxes, ordinarily an elemental image group located in the central position as elemental images stand in a row in the horizontal direction as represented by 1 parallax, 2 parallaxes, 3 parallaxes, 4 parallaxes, . . . , 12 parallaxes. On the other hand, in the present embodiment, the elemental image group becomes 1 parallax, background, 3 parallaxes, background, 4 parallaxes, . . . , background. In the case where black is inserted, a luminance change depending upon the place occurs, moire occurs, and image degradation occurs in some cases. On the other hand, insertion of background images as in the present embodiment has a merit that the luminance depending upon the direction of the viewer is averaged and moire becomes apt not to occur. In FIG. 7, reference numerals 7a, 7b and 7c denote elemental images of the lenses 2a, 2b and 2c, respectively. Reference numeral 11 denotes an image pattern of the stereoscopic substance on the two-dimensional display device 1. Reference numeral 11a denotes a pattern of an elemental image group for the lens 2a in the lenticular lens 2. Reference numeral 11b denotes a pattern of an elemental image group for the lens 2b. Reference numeral 11c denotes a pattern of an elemental image group for the lens 2c.

In the present embodiment, parallax images $A_B$, $B_C$, $C_D$, $D_E$, $E_F$ and $F_G$ corresponding to adjacent parallax light rays are replaced by background images having no correlation to the image pattern 12 of the stereoscopic substance. Therefore, the adjacent parallax light rays 54 having background images inserted therein are present between the main parallax light rays 13, and crosstalk does not occur. As a result, the multiple image and defocusing do not occur.

Third Embodiment

A stereoscopic image display apparatus according to a third embodiment of the present invention will now be described with reference to FIG. 8.

The less crosstalk, the better. Even if there is crosstalk, it is desirable that the crosstalk is within two or three parallaxes. In the case of two parallaxes, the multiple image can be prevented if black is inserted at a rate of one parallax image every two parallax images as in the first and second embodiments.

Figure 8:
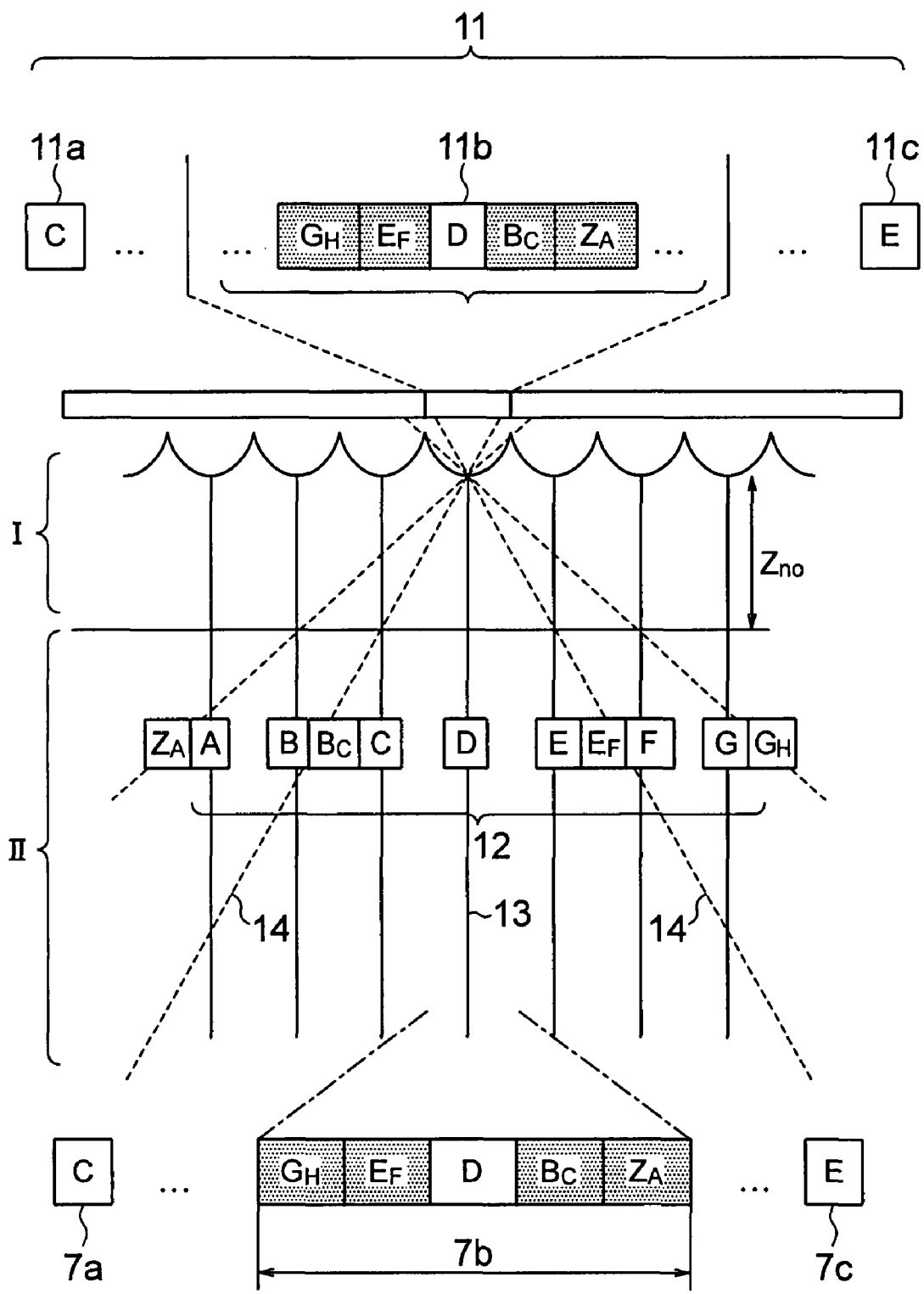
FIG. 8 is a diagram for explaining a stereoscopic image display apparatus according to a third embodiment.

If the crosstalk becomes at least three parallaxes, however, not only an adjacent parallax light ray which is closest to the central parallax light ray serving as the main parallax light ray 13, but also adjacent parallax light rays which are closest secondly appear on both sides of the main parallax light ray as shown in FIG. 8.

In the stereoscopic image display apparatus according to the present embodiment, therefore, black insertion is conducted at a rate of two parallaxes every three parallaxes as shown in FIG. 8. For example, in elemental images 11b corresponding to the lens 2b in the image pattern 11 of the stereoscopic substance assigned to the two-dimensional display device 1, elemental images $B_C$, $E_F$, $G_H$ and $Z_A$ corresponding to adjacent light rays located on both sides of an elemental image D corresponding to the main parallax light ray 13 are displayed black. As a result, the viewer can view only the main parallax light ray 13, and the multiple image can be prevented. If black insertion is conducted at a rate of two parallaxes every three parallaxes, however, parallax light rays are considerably thinned. Therefore, the present embodiment is effective to a stereoscopic image display apparatus having a high light ray density, i.e., having comparatively high N (number of parallaxes)/2θ (viewing angle). If background images are inserted instead of black insertion, the background images become more conspicuous than the stereoscopic substance. In the case where thinning is conducted at a rate of two parallaxes every three parallaxes, therefore, it is more desirable to insert black. In FIG. 8, reference numerals 7a, 7b and 7c denote elemental images of the lenses 2a, 2b and 2c, respectively. Reference numeral 11 denotes an image pattern of the stereoscopic substance on the two-dimensional display device 1. Reference numeral 11a denotes a pattern of an elemental image group for the lens 2a in the lenticular lens 2. Reference numeral 11b denotes a pattern of an elemental image group for the lens 2b. Reference numeral 11c denotes a pattern of an elemental image group for the lens 2c.

In the present embodiment as well, it is possible to prevent a multiple image and defocusing from being caused by crosstalk.

Fourth Embodiment

A stereoscopic image display apparatus according to a fourth embodiment of the present invention.

If black is inserted into parallax light rays corresponding to the image pattern of the stereoscopic substance and light rays are thinned, the luminance becomes dark. For example, if black is inserted into one parallax every two parallaxes, the luminance becomes half on the average.

Figure 9:
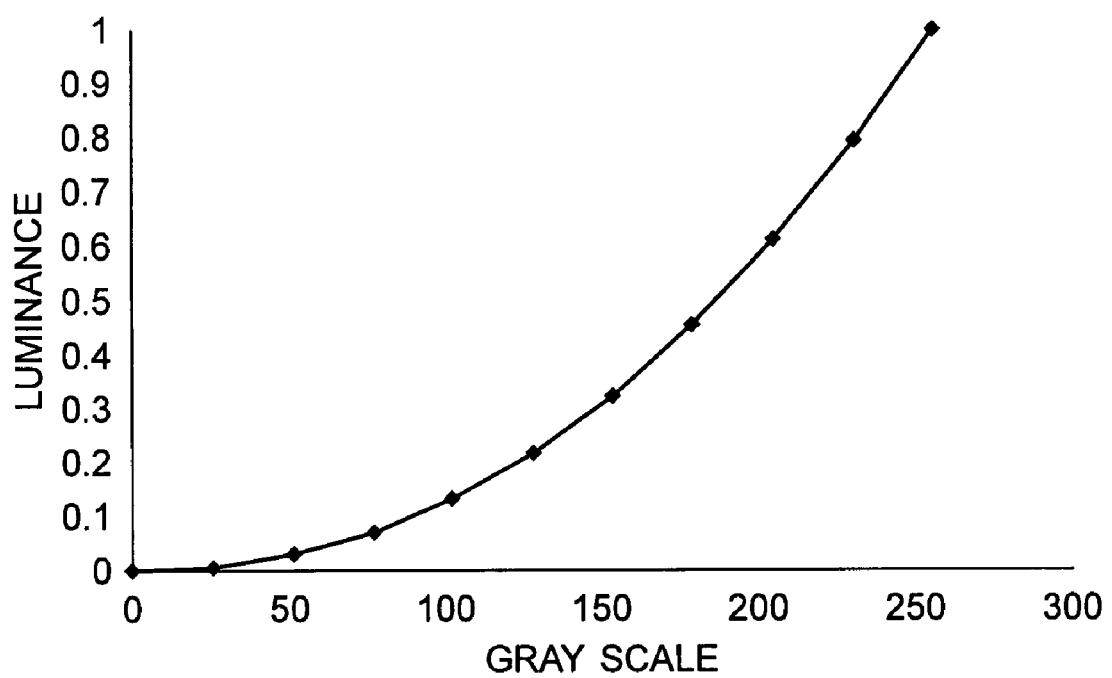
FIG. 9 is a diagram showing a relation between luminance and a sub-pixel gray scale in a stereoscopic image display apparatus according to an embodiment.

The stereoscopic image display apparatus according to the present embodiment has a configuration which conducts luminance correction in only places where black is inserted into adjacent parallax light rays in the stereoscopic image display apparatus according to the first or third embodiment. As for the luminance correction value, there is a relation between the luminance and the gray scale as shown in FIG. 9. Therefore, it is desirable to extract a stereoscopic substance which has exceeded the near-side limit or the far-side limit, calculate a gray scale increase rate for doubling the luminance with respect to the stereoscopic substance, and conduct luminance correction. If the luminance of the stereoscopic substance is originally high and the doubled luminance exceeds 100%, it is possible to reduce the luminance other than that of the stereoscopic substance to half and adjust the entire luminance balance. If the luminance of the stereoscopic substance is originally high and the doubled luminance exceeds 100%, it is also possible as an alternate method to reduce the luminance other than that of the stereoscopic substance to half and restore the entire luminance to the original luminance by doubling the luminance with backlight. Especially in the case of a still picture, a double image and luminance balance become conspicuous and consequently it is desirable to execute the alternate method.

In the present embodiment as well, it is possible to prevent a multiple image and defocusing from being caused by crosstalk.

Crosstalk reduction processing in the stereoscopic image display apparatus according to the first to fourth embodiments will now be described.

Figure 10:
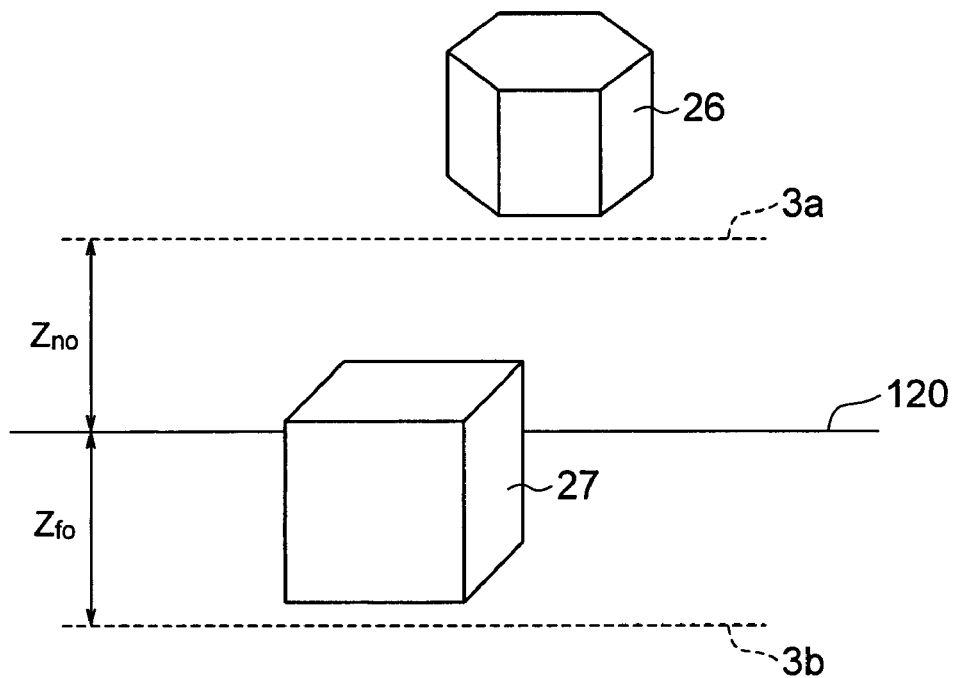
FIG. 10 is a diagram showing a stereoscopic substance of a model base in a stereoscopic image display apparatus according to an embodiment.

FIG. 10 is a schematic diagram showing which positions stereoscopic substances 26 and 27 are located in with respect to a display surface of the stereoscopic image display apparatus, i.e., the surface 120 of the lenticular lens 2 shown in FIG. 1. In FIG. 10, a stereoscopic substance 26 having a projection position which exceeds a near-end limit value Zno and a stereoscopic substance 27 having a projection position which is within a far-end limit value are shown. Between the stereoscopic substances 26 and 27 shown in FIG. 10, crosstalk reduction processing is conducted on the stereoscopic substance 26.

Figure 11:
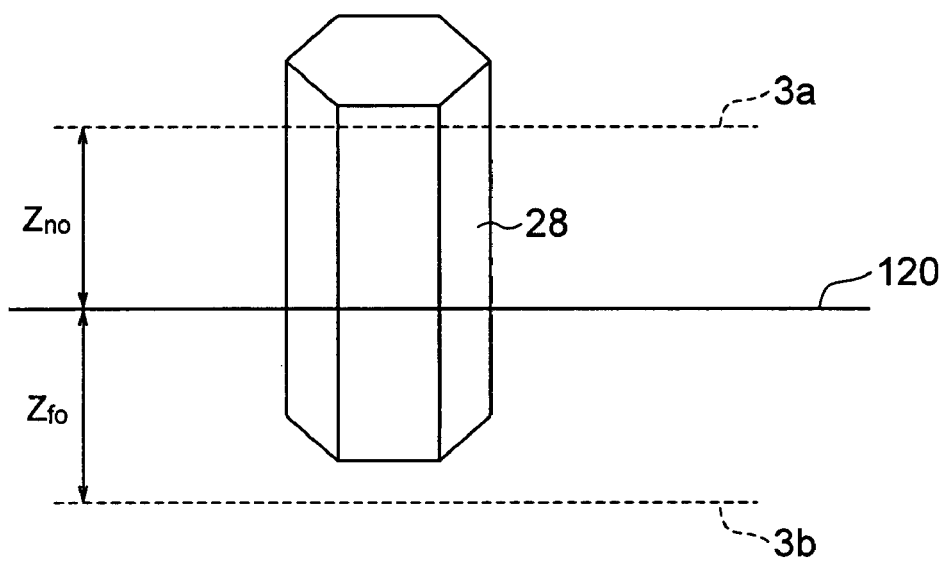
FIG. 11 is a diagram showing a stereoscopic substance of a model base in a stereoscopic image display apparatus according to an embodiment.

FIG. 11 is a schematic diagram showing which position a different stereoscopic substance 28 is located in with respect to the display surface 120. FIG. 11 shows a stereoscopic substance 28 having a projection position which exists striding over within the far-end limit value and outside of the near-end limit value. The stereoscopic substance 28 shown in FIG. 11 is also subjected to crosstalk reduction processing.

Figure 12:
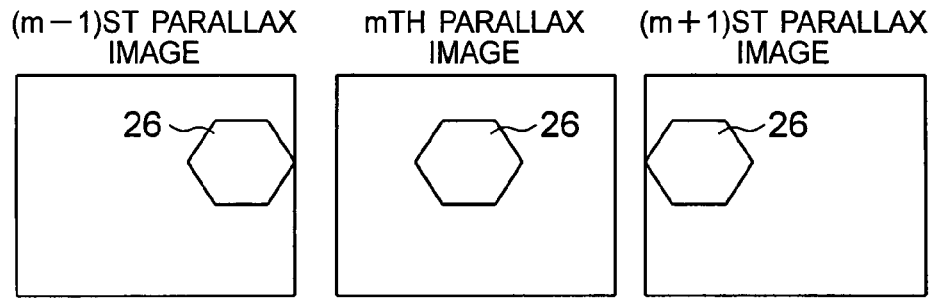
FIGS. 12 to 19 are diagrams for explaining a rendering process in a stereoscopic image display apparatus according to an embodiment.
Figure 13:
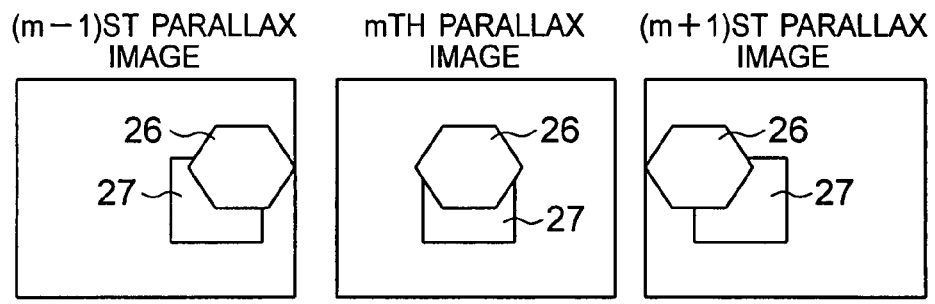

When producing (or acquiring) parallax images (or camera images) for the stereoscopic substances 26 and 27 disposed as shown in FIG. 10, parallax images (or camera images) of mth parallaxes or a larger required number of parallaxes of only the stereoscopic substance 26 are produced (or acquired) in the model stage. A group of a plurality of parallax images (or camera images) thus produced (or acquired) shown in FIG. 12 is hereafter called specific stereoscopic parallax image group. Concurrently with the production of the specific stereoscopic parallax image group, parallax images (or camera images) of mth parallaxes or a larger required number of parallaxes including the stereoscopic substances 26 and 27 and the background images are produced (or acquired) as usual as shown in FIG. 13. A group of a plurality of parallax images (or camera images) shown in FIG. 13 is hereafter called ordinary parallax image group (or camera images). The parallax image groups (or camera images) shown in FIGS. 12 and 13 show the case where the stereoscopic substances 26 and 27 are viewed from the top.

Figure 32:
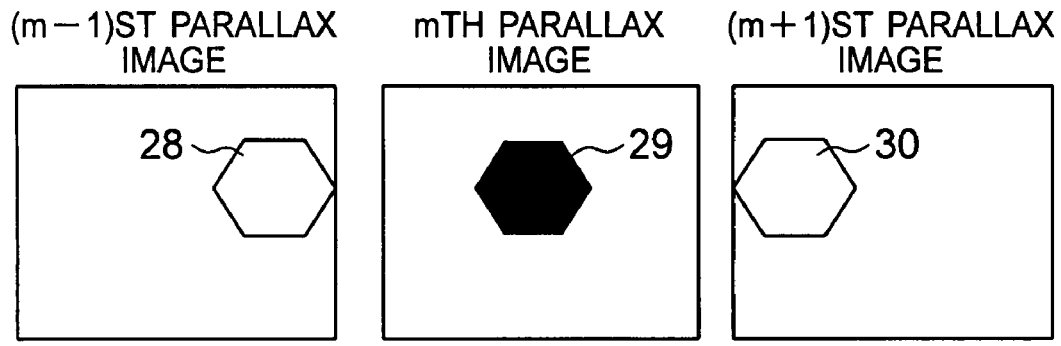
FIG. 32 is a diagram for explaining a rendering process in a stereoscopic image display apparatus according to an embodiment of the present invention.
Figure 33:
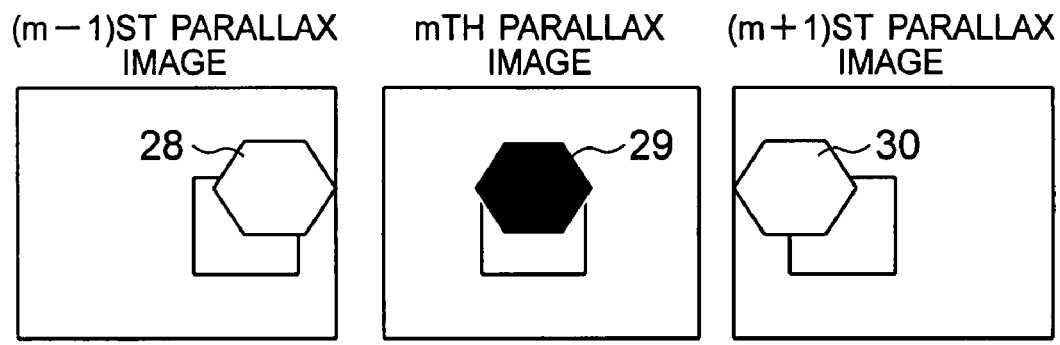
FIG. 33 is a diagram for explaining a rendering process in a stereoscopic image display apparatus according to an embodiment of the present invention.

The specific stereoscopic parallax image group formed of parallax images (or camera images) produced (or acquired) for the stereoscopic substance 26 as shown in FIG. 12 is divided into even-numbered parallaxes and odd-numbered parallaxes, and either of them are made black. A parallax image group (or camera images) having specific parallax images made black shown in FIG. 32 is hereafter referred to as specific black inserted parallax image group. The specific black inserted parallax image group (or camera images) shown in FIG. 32 and the ordinary parallax image (or camera image) shown in FIG. 13 are compounded. At that time, the parallax image (or camera image) with black inserted is written into the ordinary parallax image (or camera image). As a result, it is possible to obtain a parallax image group with one parallax between two parallaxes displayed black with respect to the stereoscopic substances which exceed the near-side limit or the far-side limit as shown in FIG. 33. Finally, the parallax image group shown in FIG. 33 is rendered on the elemental image array displayed on the two-dimensional display device 1 which is disposed on the back of the 3D display shown in FIG. 1. As a result, a 3D display image in which the crosstalk can be reduced is obtained.

Figure 14:
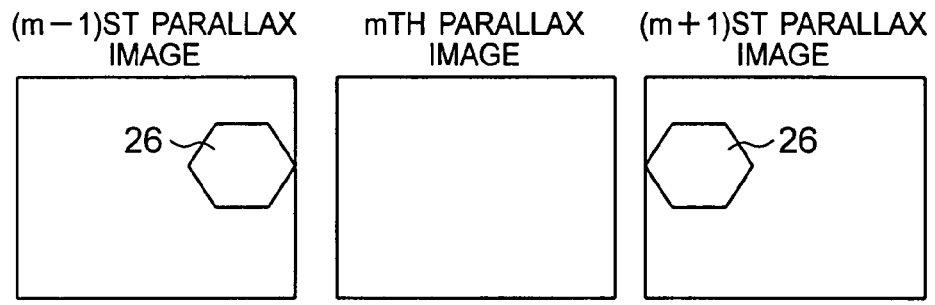
Figure 15:
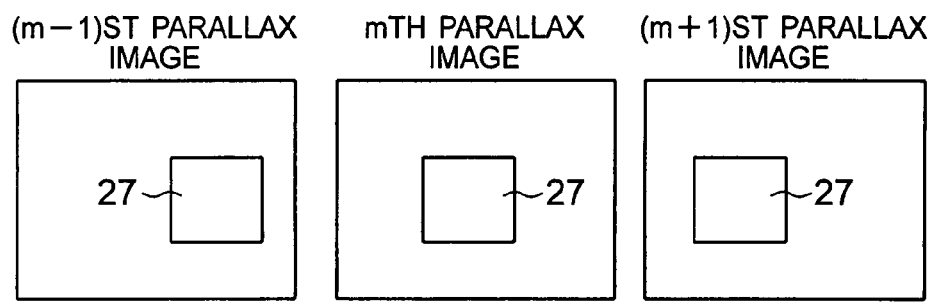

The specific stereoscopic parallax image group formed of parallax images (or camera images) produced (or acquired) for the stereoscopic substance 26 shown in FIG. 12 is divided into even-numbered parallaxes and odd-numbered parallaxes, and either of them are eliminated. A resultant parallax image group is shown in FIG. 14. Subsequently, as shown in FIG. 15, the stereoscopic substance 26 is eliminated in the model stage. Parallax images (or camera images) of mth parallaxes or a larger required number of parallaxes including the stereoscopic substance 27 and a background image are produced (or acquired). A resultant parallax image group shown in FIG. 15 is hereafter called background parallax image group. The specific stereoscopic images with partial parallax images eliminated shown in FIG. 14 and the background parallax images (or camera images) shown in FIG. 15 are compounded. At that time, the specific stereoscopic images (or camera images) shown in FIG. 14 are overwritten on the background parallax images (or camera images) shown in FIG. 15. As a result, it is possible to produce (or acquire) images with background images inserted after rendering of the stereoscopic image display apparatus according to the second embodiment. The parallax images (or camera images) shown in FIGS. 14 and 15 show the case where the stereoscopic substances 26 and 27 are viewed from the top.

Figure 16:
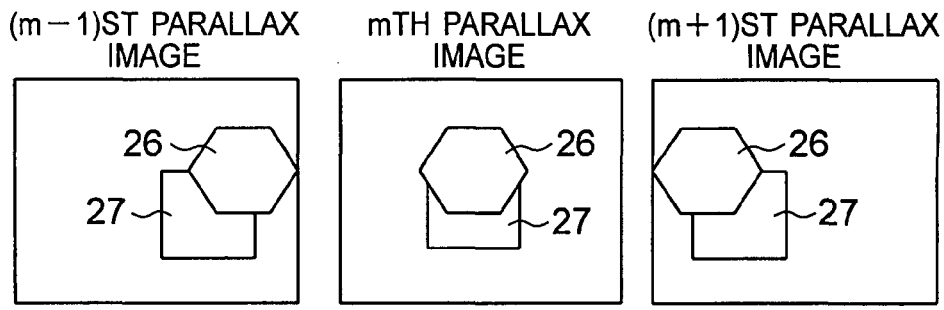
Figure 17:
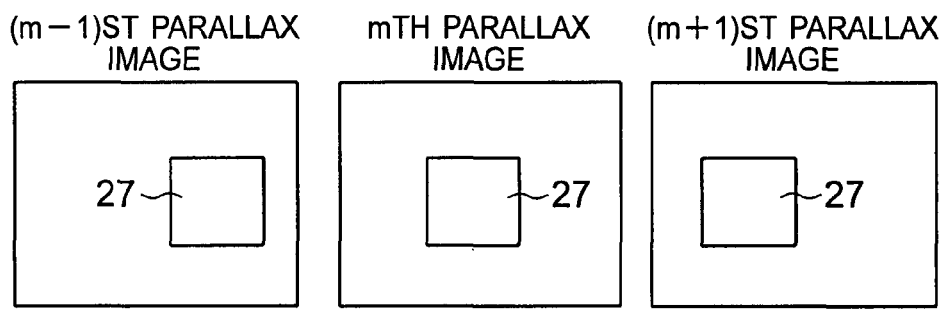
Figure 34:
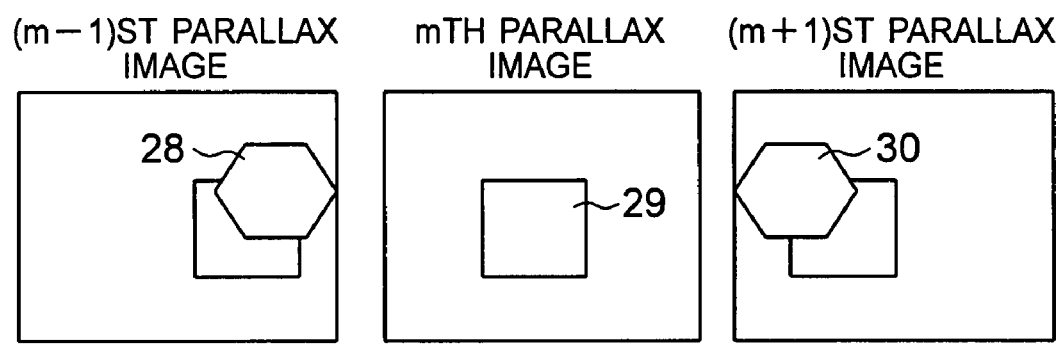
FIG. 34 is a diagram for explaining a rendering process in a stereoscopic image display apparatus according to an embodiment of the present invention.

When producing (or acquiring) parallax images (or camera images) in FIG. 10, the specific stereoscopic parallax image group shown in FIG. 13 and the background parallax image group shown in FIG. 15 are acquired. Subsequently, the parallax images (or camera images) shown in FIGS. 16 and 17 are selected alternately at the time of even-numbered parallax or odd-numbered parallax. As a result, images after rendering with the background image inserted as shown in FIG. 34 can be produced (or acquired). The parallax images (or camera images) shown in FIGS. 16 and 17 show the case where the stereoscopic substances 26 and 27 are viewed from the top.

Figure 18:
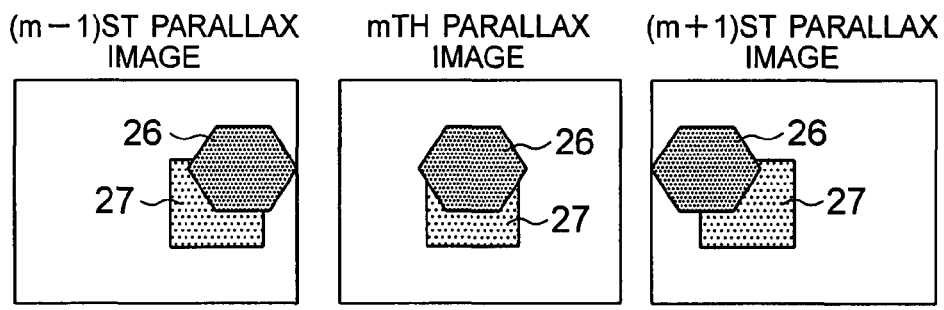
Figure 19:
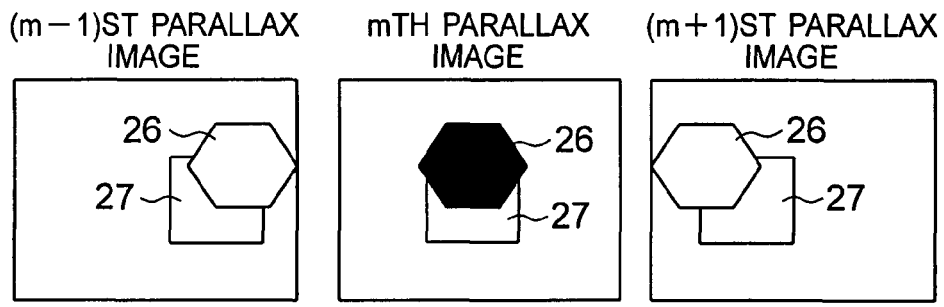

The methods for reducing the crosstalk in the stereoscopic image in the model stage shown in FIGS. 10 and 11 have been described heretofore. As for a different technique, there is a case where parallax images (or camera images) of mth parallaxes or a larger required number of parallax numbers are already present as shown in FIG. 13 and depth maps in respective parallax images (or camera images) are present as shown in FIG. 18. In that case, as to a region included in the ordinary parallax image group shown in FIG. 13 and located away from the display surface beyond the near-side limit position or the far-side limit position, coordinates are extracted from the depth map shown in FIG. 18. Thereafter, a parallax image group with black inserted in the coordinate positions at even-numbered parallax or odd-numbered parallax as shown in FIG. 19 is produced and rendered. As a result, images after the rendering in the stereoscopic image display apparatus according to the first embodiment can be produced.

According to the foregoing description, a stereoscopic image producing method according to an embodiment of the present invention is a stereoscopic image producing method for a stereoscopic image display apparatus including a two-dimensional display device having a display surface formed of a plurality of pixels arranged in a matrix form, and an optical plate which is provided in front of the display surface of the two-dimensional display device, which includes a plurality of lenses arranged so as to be respectively associated with elemental images each including a plurality of pixels, and which controls light rays illuminated from the pixels. The stereoscopic image producing method includes acquiring near-side coordinate positions and far-side coordinate positions of a stereoscopic substance, and inserting black or an image pattern located behind the stereoscopic substance into an image of one parallax every two parallaxes in parallax images of the stereoscopic substance, at coordinates in a direction perpendicular to the display surface included in the near-side coordinate positions and far-side coordinate positions.

A stereoscopic image producing method according to an embodiment of the present invention is a stereoscopic image producing method for fabricating a stereoscopic image by using a parallax image group formed of parallax images each having a depth map, the stereoscopic image producing method including inserting black or an image pattern located behind the stereoscopic substance into an image of one parallax every two parallaxes, with respect to an image located away from a display surface beyond a near-side limit position or a far-side limit position in the depth map.

Figure 20:
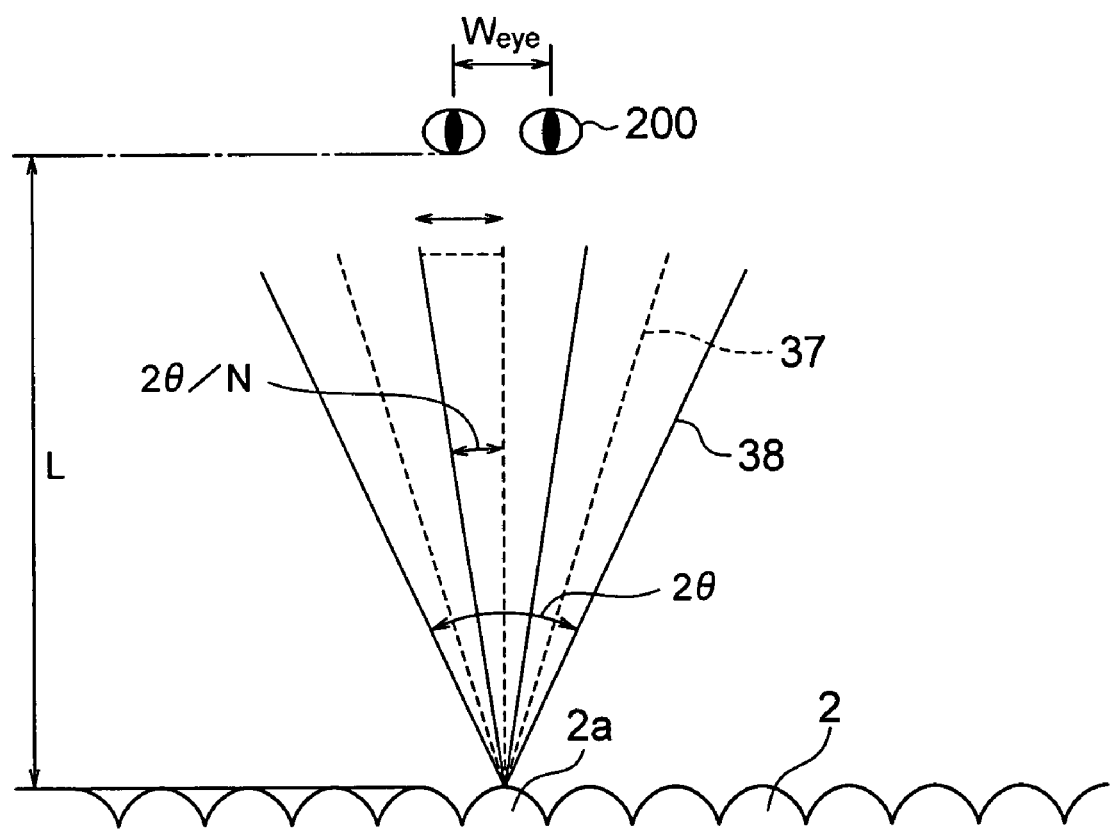
FIG. 20 is a diagram for explaining that strength of a light ray entering eyes of a viewer is weakened when black insertion and background insertion are conducted in one parallax out of two parallaxes.

In the stereoscopic image display apparatuses according to the first and second embodiments, black insertion is conducted at a rate of one parallax every two parallaxes. As shown in FIG. 20, light rays from one lens, for example, the lens 2a include parallax light rays 37 which are not subjected to the black insertion or the background insertion and parallax light rays 38 which are subjected to the black insertion or the background insertion. Strength of the parallax light rays entering eyes of the viewer 200 becomes lower. If a light ray pitch at a viewing distance L which depends upon the light ray strength becomes wider than a distance Weye between left and right eyes, it becomes impossible to recognize the stereoscopic image with both eyes, resulting in a problem. This phenomenon is apt to occur when the original viewing zone angle is wide.

Therefore, black insertion or background image insertion is conducted at a rate of one parallax every two parallaxes for stereoscopic display when the number of parallaxes and the viewing zone angle satisfy the relation $$2 \times TAN(2\theta/N) \times L < Weye \quad (1)$$

where N is the total number of elemental images per lens, $2\theta$ is a viewing zone angle illuminated per lens, and Weye is the distance between the left and right eyes. By doing so, display degradation is prevented.

Figure 21:
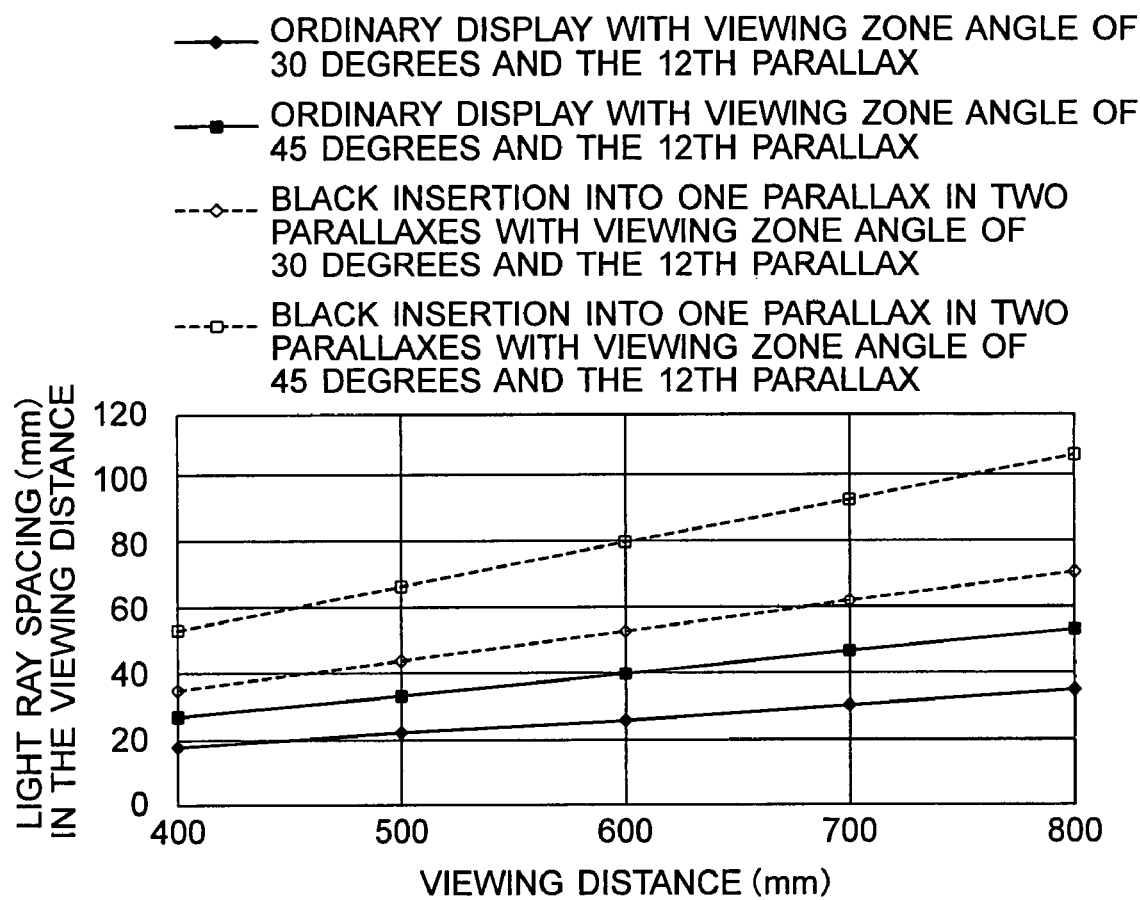
FIG. 21 is a diagram showing a viewing distance and light ray spacing on a single eye of a viewer in a stereoscopic image display apparatus according to an embodiment of the present invention.

FIG. 21 shows the light ray spacing at the viewing distance in the display of the conventional image display apparatus, i.e., the display of the stereoscopic image display apparatus which does not conduct black insertion or background insertion and the display of the stereoscopic image display apparatus according to the embodiment, i.e., the display subjected to the black insertion. It is appreciated from FIG. 21 that the light ray strength is doubled at the same viewing distance by conducting the black insertion as compared with the conventional image display apparatus. According to the expression (1) and FIG. 21, the light ray spacing becomes larger than the distance 65 mm between eyes, when the viewing distance is at least 500 mm with the viewing zone angle of 45 degrees and 12 parallaxes. Therefore, it is desirable to view the stereoscopic image with the viewing distance of 500 mm or less, the viewing zone angle of 45 degrees and 12 parallaxes.

FIG. 21 shows the light ray spacing as a function of the viewing distance under some parallax numbers and viewing zone angles. It is appreciated that the viewing distance must be made shorter as the viewing zone angle becomes larger under the condition of the same parallax number.

It is supposed the viewer views a stereoscopic substance in the conventional art and the stereoscopic substance is in a position located on the near-side beyond the near-side limit value or on the far-side beyond the far-side limit value as shown in FIG. 31(a) to 31(c). When the parallax image viewed in a position in the horizontal direction shifts from the (m−1)st parallax to the mth parallax, a double image is produced in a position where both the (m−1)st parallax and the mth parallax are seen as described above.

As in the first embodiment, therefore, one parallax image in two parallax images is made black. As a result, doubly overlapping parts become inconspicuous as shown in FIG. 22(a), 22(b) and 22(c). If the width of the stereoscopic substance viewed from the viewer strides over only the (m−1)st parallax and the mth parallax when black insertion is conducted at a rate of one parallax every two parallaxes, discontinuous parts of the stereoscopic substance can be made inconspicuous (see FIGS. 22(b) and 22(c)). In FIGS. 22(a), 22(b) and 22(c), reference numeral 1 denotes a two-dimensional display device, reference numeral 2 is a lenticular lens, reference numeral 13 is a main parallax light ray, 16 a parallax number assigned on the two-dimensional display device 1, reference numeral 17 is a stereoscopic substance, reference numeral 19 is an image pattern of the mth parallax number viewed by a viewer concerning the stereoscopic substance 17, and reference numeral 20 is an image pattern of the (m−1)st parallax number viewed by the viewer concerning the stereoscopic substance 17.

Figure 25:
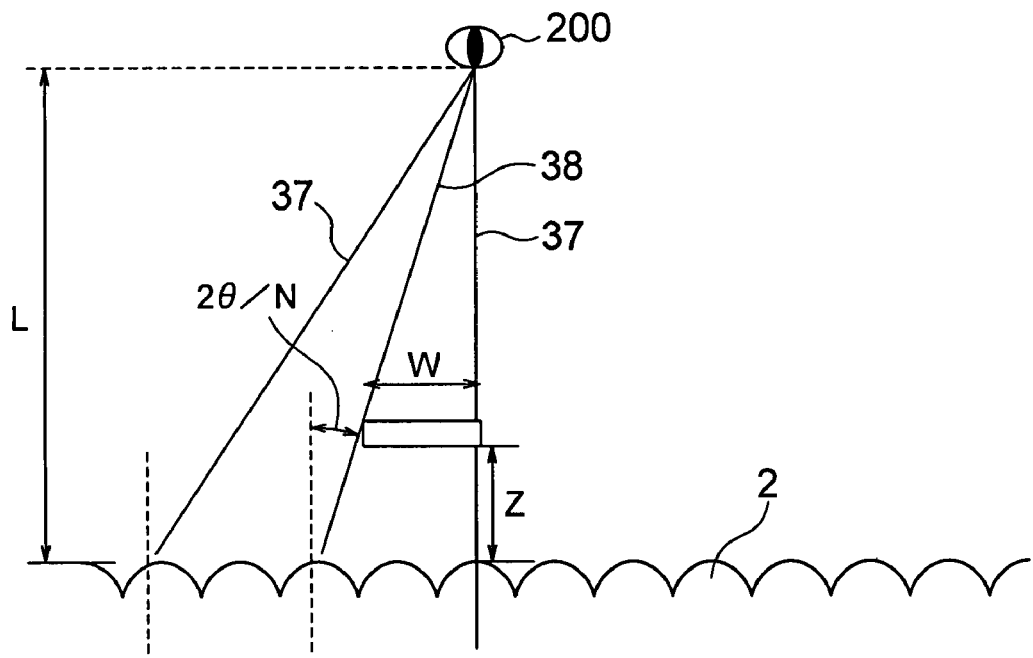
FIG. 25 is a diagram for explaining a range in which an arbitrary parallax image of a stereoscopic substance is mainly seen than adjacent parallax images in a conventional stereoscopic image display apparatus.
Figure 26:
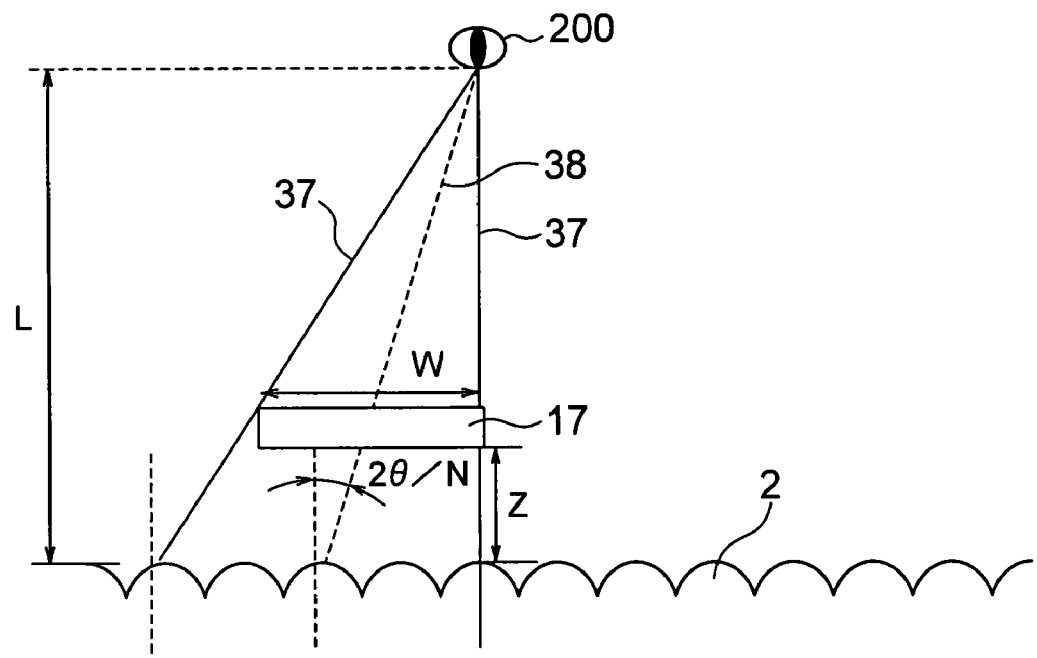
FIG. 26 is a diagram for explaining a range in which an arbitrary parallax image of a stereoscopic substance is mainly seen than adjacent parallax images in a stereoscopic image display apparatus according to an embodiment of the present invention.

The condition will now be found from FIG. 25. It is desirable from FIG. 25 to satisfy the relation $$w < 2 \times TAN(2\theta/N) \times (L-z)$$

where z is a projection quantity of the stereoscopic substance 17, w is the width, and L is the viewing distance. FIG. 25 shows a stereoscopic substance which does not look like a double image in the conventional art. FIG. 26 shows a stereoscopic substance which does not look like a double image in an embodiment of the present invention. If the crosstalk quantity is approximately two parallaxes, a region in which a certain parallax image looks more principal than adjacent parallax images becomes a range between a position in which the light ray locus extended from the viewer 200 toward the center of a certain lens arrives at a black matrix located on the right so as to be adjacent to the parallax image of the mth parallax in FIG. 25 and a position in which the light ray locus arrives at a black matrix located on the left so as to be adjacent to the parallax image of the mth parallax. If the stereoscopic substance 17 is located on the left side as compared with the range in FIG. 25, the (m−1)st parallax image becomes the region which looks principal. If the stereoscopic substance 17 is located on the right side as compared with the range, the (m+1)st parallax image becomes the region which looks principal.

If black is inserted every two pixels as in the first embodiment, it is possible to prevent a multiple image from being generated by crosstalk as heretofore described. If black is inserted into the mth parallax image and the (m+2)nd parallax image in FIG. 26, i.e., black is inserted into parallax images corresponding to a parallax light ray 38, a region where the (m−1)st parallax image (a parallax image corresponding to a parallax light ray 37) looks principal becomes a wide range which is approximately twice in width of w that in FIG. 25. Concrete range is described in FIG. 26.

It is supposed that the number of all elemental images per lens is N, the viewing zone angle illuminated per lens is 2θ, and the stereoscopic substance 17 has a projection quantity z, a width w and a viewing distance L. If θ is sufficiently small and the region satisfies the relation tan(2θ/N)=2θ/N, a region in which an image corresponding to one parallax looks principal corresponds to an angle (2θ/N) obtained by dividing the whole viewing zone angle by the number of parallaxes.

From the similarity relation of triangles shown in FIG. 25, therefore, we get $$\text{Tan}(2\theta/N)=w/(L-z)$$

$$w=\text{Tan}(2\theta/N)\times(L-z)$$

By making the mth parallax image and the (m−2)nd parallax image black in FIG. 26, the region in which the (m−1)st parallax image looks principal is doubled. Therefore, the stereoscopic substance 17 in a range represented by $$2w=2\times\text{Tan}(2\theta/N)\times(L-z)$$

can be displayed without generating a multiple image.

It is appreciated from FIGS. 25 and 26 that the width of the stereoscopic substance 17 for hiding discontinuity can be widened by conducting the black insertion.

Figure 22:
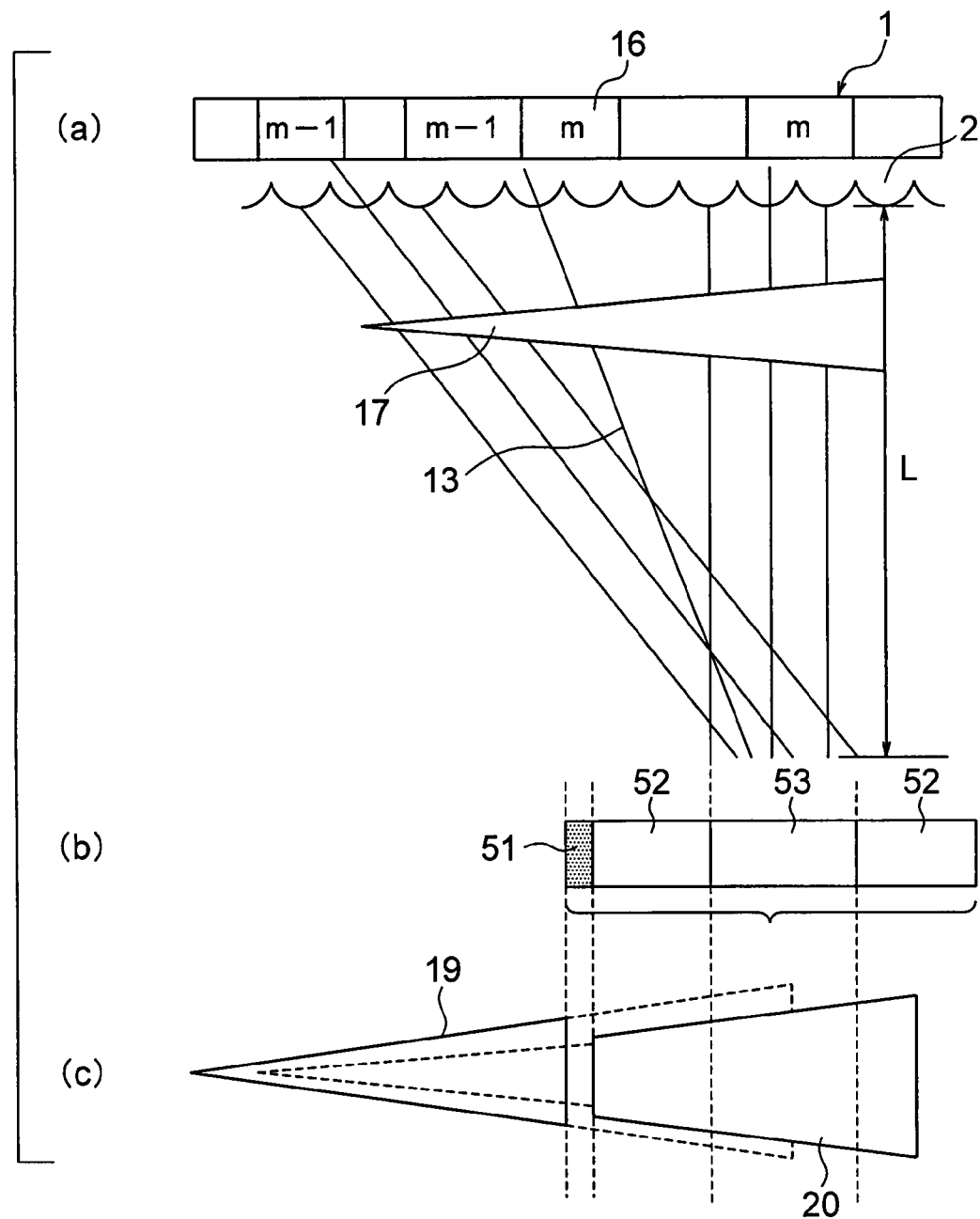
FIGS. 22($a$) to 22($c$) are diagrams for explaining another effect of a stereoscopic image display apparatus according to an embodiment of the present invention.
Figure 23:
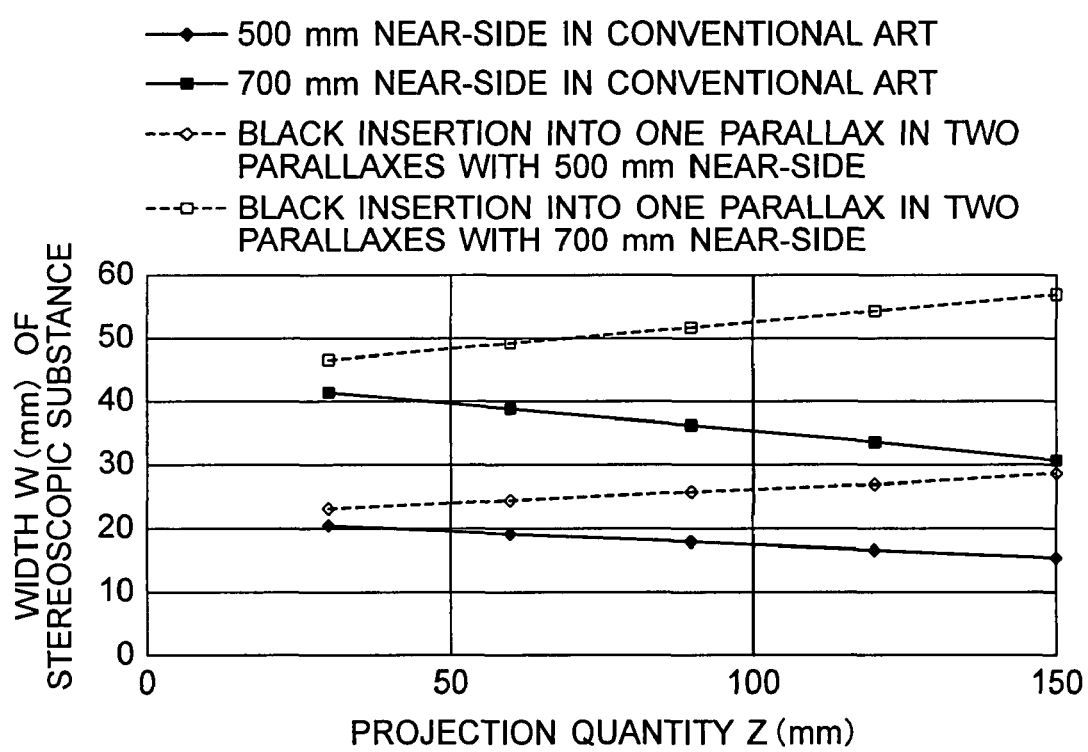
FIG. 23 is a diagram showing a relation between a projection quantity Z and a horizontal width of a stereoscopic substance with respect to a viewing distance in a stereoscopic image display apparatus according to an embodiment of the present invention.

Concrete effects will now be described with reference to FIGS. 22 and 23. Unless the horizontal width of the stereoscopic substance is 200 mm or less when the projection is 50 mm in the conventional art with the viewing distance of 500 mm as shown in FIG. 23, a discontinuous face as shown in FIG. 31 is seen. By inserting black into one parallax in two parallaxes as in the first embodiment under the condition that the crosstalk has approximately two parallaxes, however, the stereoscopic image can be viewed without discontinuity when the horizontal width of the stereoscopic substance is 40 mm or less. As to its discontinuous face as well, degradation such as looking double as shown in FIG. 22(c) is remarkably reduced.

Figure 24:
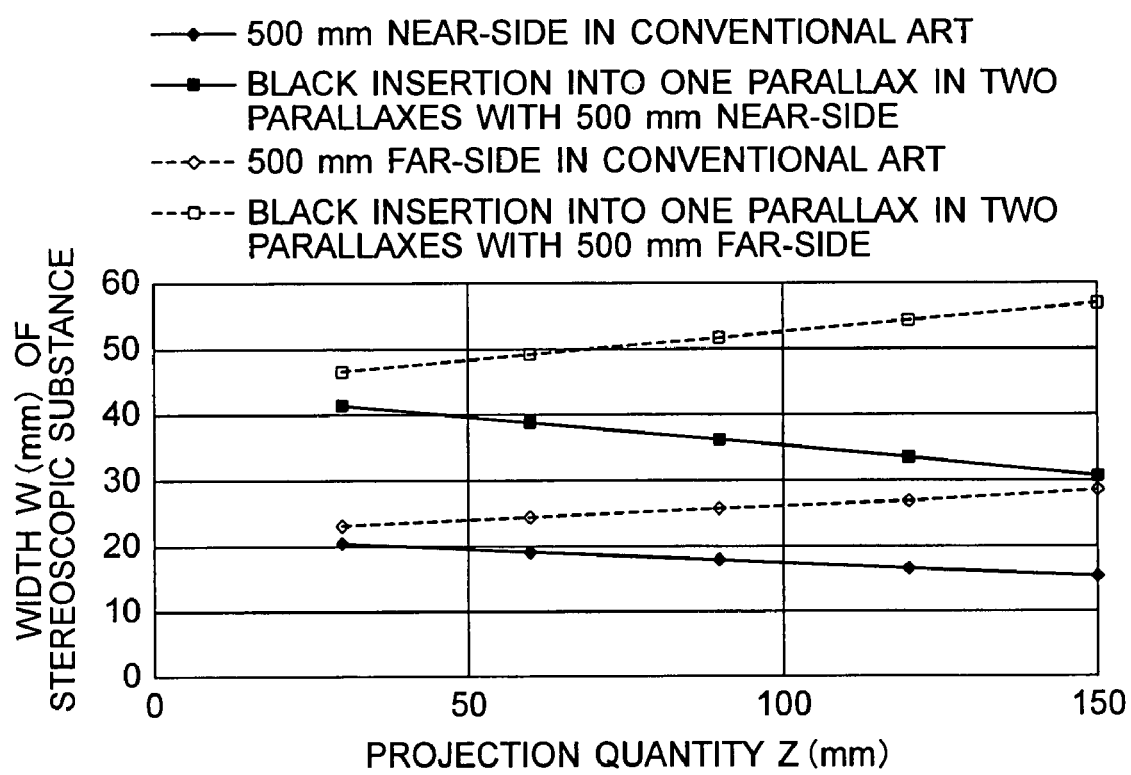
FIG. 24 is a diagram showing a relation between a projection quantity Z and a horizontal width of a stereoscopic substance with respect to a near-side position and a far-side position in a stereoscopic image display apparatus according to an embodiment of the present invention.

Another concrete example will now be described with reference to FIG. 24. It is appreciated from FIG. 24 that as the distance from the display increases in the case of the near-side position the limit width of the stereoscopic substance which can be viewed without discontinuity becomes narrower. However, as the distance from the display increases in the case of the far-side position, the limit width of the stereoscopic substance in which discontinuity is seen becomes larger.

Also when calculating the stereoscopic information for the stereoscopic image display apparatus in an interactive manner, thinning the parallax images to such a degree that the image degradation is not conspicuous brings about a merit that the calculation load is reduced and the processing speed is improved.

According to the embodiments of the present invention, a multiple image is suppressed and defocusing due to crosstalk is prevented when the near-side position has exceeded the near-side limit or the far-side position has exceeded the far-side limit, as heretofore described. As a result, the distance of the resolution limit in the z direction can be extended apparently. It is possible to provide a stereoscopic display apparatus which makes the moire caused by the crosstalk reduction inconspicuous by restricting the black insertion position or background insertion position according to the projection position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A stereoscopic image display apparatus comprising:
    a two-dimensional display device having a display surface formed of a plurality of pixels arranged in a matrix form; and
    an optical plate which is provided in front of the display surface of the two-dimensional display device, which comprises a plurality of lenses arranged so as to be respectively associated with elemental images each including a plurality of pixels, and which controls light rays illuminated from the pixels,
    wherein when at least two and less than three elemental images are illuminated in one parallax direction in case where a position of a part or whole of a stereoscopic image is located on a side nearer a viewer than a position indicating a near-side limit value Zno or on a side farther from the viewer than a position indicating a far-side limit value Zfo, the two-dimensional display device displays black in an elemental image of one parallax in elemental images of every two parallaxes.

2. The apparatus according to claim 1, wherein the elemental image displayed black is increased in luminance as compared with case where black display is not conducted.

3. The apparatus according to claim 1, wherein the black display is conducted when number of parallaxes and a viewing zone angle satisfy a relation $$2\times L\times\text{TAN}(2\theta/N)<W_{eye}$$

where N is a total number of elemental images per lens, 2θ is a viewing zone angle illuminated per lens, and Weye is a distance between left and right eyes.

4. The according to claim 1, wherein the black display is conducted when a width w of the stereoscopic image is less than a value of $$2\times\text{TAN}(2\theta/N)\times(L-z)$$

where z is a distance between a stereoscopic image and the lens surface, and L is a viewing distance.

5. The apparatus according to claim 1, wherein
    the near-side limit value Zno and the far-side limit value Zfo are represented by $$Zno=L\times D/(1+D)$$

$$Zfo=-L\times D/(1-D)$$

where $$D = \frac{(lp)^2}{2L\tan(\theta)}$$

and
    L is a viewing distance at time of image production, lp is a lens pitch, 2θ is a viewing angle, and $p_p$ is a pixel pitch.

6. A stereoscopic image display apparatus comprising:
    a two-dimensional display device having a display surface formed of a plurality of pixels arranged in a matrix form; and
    an optical plate which is provided in front of the display surface of the two-dimensional display device, which comprises a plurality of lenses arranged so as to be respectively associated with elemental images each including a plurality of pixels, and which controls light rays illuminated from the pixels, wherein when at least two and less than three elemental images are illuminated in one parallax direction in case where a position of a part or whole of a stereoscopic image is located on a side nearer a viewer than a position indicating a near-side limit value Zno or on a side farther from the viewer than a position indicating a far-side limit value Zfo, the two-dimensional display device displays a background image in an elemental image of one parallax in elemental images of every two parallaxes, and the background image has no correlation to the elemental image.

7. The apparatus according to claim 6, wherein
the near-side limit value Zno and the far-side limit value Zfo are represented by $$Zno = L \times D/(1+D)$$

$$Zfo = -L \times D/(1-D)$$

where $$D = \frac{(lp)^2}{2L\tan(\theta)}$$

and

L is a viewing distance at time of image production, lp is a lens pitch, $2\theta$ is a viewing angle, and $p_p$ is a pixel pitch.

8. A stereoscopic image display apparatus comprising:
a two-dimensional display device having a display surface formed of a plurality of pixels arranged in a matrix form; and
an optical plate which is provided in front of the display surface of the two-dimensional display device, which comprises a plurality of lenses arranged so as to be respectively associated with elemental images each including a plurality of pixels, and which controls light rays illuminated from the pixels, wherein when at least three elemental images are illuminated in one parallax direction in case where a position of a part or whole of a stereoscopic image is located on a side nearer a viewer than a position indicating a near-side limit value Zno or on a side farther from the viewer than a position indicating a far-side limit value Zfo, the two-dimensional display device displays black in elemental images of two parallaxes in elemental images of every three parallaxes.

9. The apparatus according to claim 8, wherein the elemental image displayed black is increased in luminance as compared with case where black display is not conducted.

10. The apparatus according to claim 8, wherein
the near-side limit value Zno and the far-side limit value Zfo are represented by $$Zno = L \times D/(1+D)$$

$$Zfo = -L \times D/(1-D)$$

where $$D = \frac{(lp)^2}{2L\tan(\theta)}$$

and

L is a viewing distance at time of image production, lp is a lens pitch, $2\theta$ is a viewing angle, and $p_p$ is a pixel pitch.

* * * * *